(12) United States Patent
Jensen et al.

(10) Patent No.: US 10,608,342 B2
(45) Date of Patent: Mar. 31, 2020

(54) MULTI-BAND, DUAL-POLARIZATION REFLECTOR ANTENNA

(71) Applicant: VIASAT, INC., Carlsbad, CA (US)

(72) Inventors: Anders Jensen, Johns Creek, GA (US); Donald L Runyon, Johns Creek, GA (US)

(73) Assignee: Viasat, Inc., Carlsbad, CA (US)

( * ) Notice: Subject to any disclaimer, the term of this patent is extended or adjusted under 35 U.S.C. 154(b) by 0 days.

(21) Appl. No.: 16/122,757

(22) Filed: Sep. 5, 2018

(65) Prior Publication Data

US 2019/0006768 A1    Jan. 3, 2019

Related U.S. Application Data

(63) Continuation of application No. 15/059,214, filed on Mar. 2, 2016, now Pat. No. 10,096,906.

(51) Int. Cl.

| H01Q 15/16 | (2006.01) |
| --- | --- |
| H01Q 5/55 | (2015.01) |
| H01P 5/12 | (2006.01) |
| H01Q 13/02 | (2006.01) |
| H01P 5/16 | (2006.01) |
| H01P 1/17 | (2006.01) |
| H01Q 19/17 | (2006.01) |

(Continued)

(52) U.S. Cl.
CPC .............. *H01Q 15/16* (2013.01); *H01P 1/17* (2013.01); *H01P 5/12* (2013.01); *H01P 5/16* (2013.01); *H01Q 5/35* (2015.01); *H01Q 5/55* (2015.01); *H01Q 13/0241* (2013.01); *H01Q 13/0258* (2013.01); *H01Q 19/17* (2013.01); *H01Q 3/08* (2013.01); *H01Q 19/08* (2013.01)

(58) Field of Classification Search
CPC . H01Q 15/16; H01Q 5/55; H01Q 5/50; H01P 5/12
USPC ............................... 333/21 A, 135, 136, 137
See application file for complete search history.

(56) References Cited

U.S. PATENT DOCUMENTS

| 3,212,096 A | 10/1965 | Schuster et al. |
| 5,847,681 A | 12/1998 | Faherty et al. |

(Continued)

FOREIGN PATENT DOCUMENTS

| CN | 102610927 A | 7/2012 |
| EP | 2768076 A1 | 8/2014 |

(Continued)

OTHER PUBLICATIONS

Sudhakar Rao et al., "Multiband Reflector Antennas", Handbook of Reflector Antennas and Feed Systems, Jun. 1, 2013, pp. 215-241, Chapter 5, Artech House.

(Continued)

*Primary Examiner* — Stephen E. Jones
(74) *Attorney, Agent, or Firm* — Holland & Hart LLP

(57) ABSTRACT

An antenna includes a reflector and a waveguide assembly. The waveguide assembly includes a feed assembly and a support member that extends from behind the reflector to orient the feed assembly for direct illumination of the reflector. The waveguide assembly includes a first waveguide coupled to a first portion of a common waveguide, a second waveguide coupled to a second portion of the common waveguide, and a septum layer that includes a septum polarizer coupled between the common waveguide and the first and second waveguides.

20 Claims, 16 Drawing Sheets

(51) Int. Cl.
  *H01Q 5/35*   (2015.01)
  *H01Q 19/08*  (2006.01)
  *H01Q 3/08*   (2006.01)

(56) References Cited

U.S. PATENT DOCUMENTS

| | | |
|---|---|---|
| 6,208,312 B1 | 3/2001 | Gould |
| 6,504,514 B1 | 1/2003 | Toland et al. |
| 6,677,911 B2 | 1/2004 | Moheb |
| 6,714,165 B2 | 3/2004 | Verstraeten |
| 6,720,932 B1 | 4/2004 | Flynn et al. |
| 7,236,681 B2 | 6/2007 | Moheb et al. |
| 7,242,360 B2 | 7/2007 | Wu et al. |
| 7,728,782 B2 | 6/2010 | Watson et al. |
| 7,737,904 B2 | 6/2010 | Rao et al. |
| 8,144,067 B2 | 3/2012 | Vogler |
| 8,334,815 B2 | 12/2012 | Monte et al. |
| 8,698,683 B2 | 4/2014 | Syed et al. |
| 10,096,906 B2 * | 10/2018 | Jensen ................... H01Q 15/16 |
| 10,326,213 B2 | 6/2019 | Parekh |
| 2015/0123867 A1 | 5/2015 | Legay et al. |
| 2017/0256864 A1 | 9/2017 | Jensen et al. |

FOREIGN PATENT DOCUMENTS

| | | |
|---|---|---|
| WO | 2008123836 A1 | 10/2008 |
| WO | 2015002338 A1 | 1/2015 |

OTHER PUBLICATIONS

Antenna Research, "Reflector Antenna Feed Selection Guidelines", www.ara-inc.com, 2 pages, downloaded Feb. 8, 2015.

* cited by examiner

MULTI-BAND, DUAL-POLARIZATION REFLECTOR ANTENNA

CROSS REFERENCE TO RELATED APPLICATIONS

This application is a continuation application and, pursuant to 35 U.S.C. § 120, is entitled to and claims the benefit of earlier filed application U.S. application Ser. No. 15/059,214 filed Mar. 2, 2016, the content of which is incorporated herein by reference in its entirety for all purposes.

BACKGROUND

Unless otherwise indicated, the foregoing is not admitted to be prior art to the claims recited herein and should not be construed as such.

Antenna systems can include multiple antennas in order to provide operation at multiple frequency bands. For example, in mobile applications where a user moves between coverage areas of different satellites operating at different frequency bands, each of the antennas may be used to individually communicate with one of the satellites. However, in some applications such as on an airplane, performance requirements and constraints such as size, cost and/or weight, may preclude the use of multiple antennas. Antennas for mobile applications may be reflector type antennas of a similar or common range of sizes and the reflector portion of the antenna system is itself a wideband element of the antenna and suitable for operation at multiple frequency bands.

SUMMARY

In some embodiments according to the present disclosure, an antenna may include a single reflector and a waveguide assembly. The waveguide assembly may include a feed assembly and a support member that extends from behind the reflector to orient the feed assembly for direct illumination of the reflector. The waveguide assembly may include a first housing layer having a first waveguide coupled to a first portion of a common waveguide, a second housing layer having a second waveguide coupled to a second portion of the common waveguide, and a septum layer between the first housing layer and the second housing layer. The septum layer may include a septum polarizer coupled between the common waveguide and the pair of waveguides.

The following detailed description and accompanying drawings provide a better understanding of the nature and advantages of the present disclosure.

BRIEF DESCRIPTION OF THE DRAWINGS

With respect to the discussion to follow and in particular to the drawings, it is stressed that the particulars shown represent examples for purposes of illustrative discussion, and are presented in the cause of providing a description of principles and conceptual aspects of the present disclosure. In this regard, no attempt is made to show implementation details beyond what is needed for a fundamental understanding of the present disclosure. The discussion to follow, in conjunction with the drawings, makes apparent to those of skill in the art how embodiments in accordance with the present disclosure may be practiced. In the accompanying drawings.

DETAILED DESCRIPTION

In the following description, for purposes of explanation, numerous examples and specific details are set forth in order to provide a thorough understanding of the present disclosure. It will be evident, however, to one skilled in the art that the present disclosure as expressed in the claims may include some or all of the features in these examples, alone or in combination with other features described below, and may further include modifications and equivalents of the features and concepts described herein.

Figure 1:
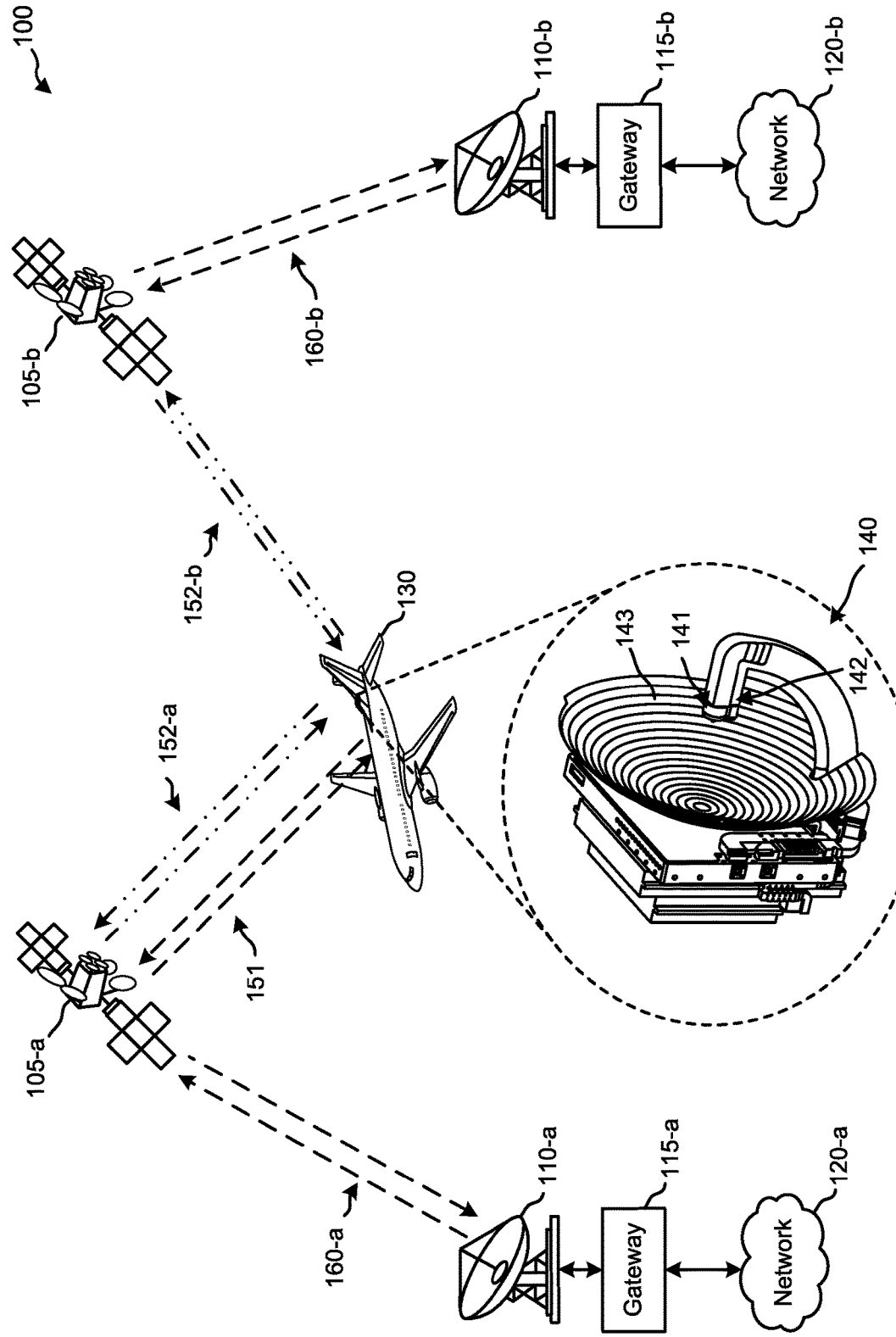
FIG. 1 is a diagram of a satellite communication system in which an antenna as described herein can be used.

FIG. 1 shows a diagram of a satellite communication system 100 in accordance with various aspects of the present disclosure. The satellite communication system 100 includes a first satellite 105-*a*, a first gateway 115-*a*, a first gateway antenna system 110-*a*, and an aircraft 130. The first gateway 115-*a* communicates with at least a first network 120 *a*. In operation, the satellite communication system 100 can provide for one-way or two-way communications between the aircraft 130 and the first network 120-*a* through at least the first satellite 105-*a* and the first gateway 115-*a*.

In some examples, the satellite communications system 100 includes a second satellite 105-*b*, a second gateway 115-*b*, and a second gateway antenna system 110-*b*. The second gateway 115-*b* may communicate with at least a second network 120-*b*. In operation, the satellite communication system 100 can provide for one-way or two-way communications between the aircraft 130 and the second network 120-*b* through at least the second satellite 105-*b* and the second gateway 115-*b*.

The first satellite 105-*a* and the second satellite 105-*b* may be any suitable type of communication satellite. In some examples, at least one of the first satellite 105-*a* and the second satellite 105-*b* may be in a geostationary orbit. In other examples, any appropriate orbit (e.g., low earth orbit (LEO), medium earth orbit (MEO), etc.) for the first satellite 105-*a* and/or the second satellite 105-*b* may be used. The first satellite 105-*a* and/or the second satellite 105-*b* may be a multi-beam satellite configured to provide service for multiple service beam coverage areas in a predefined geographical service area. In some examples, the first satellite 105-*a* and the second satellite 105-*b* may provide service in non-overlapping coverage areas, partially-overlapping coverage areas, or fully-overlapping coverage areas. In some examples, the satellite communication system 100 includes more than two satellites 105.

The first gateway antenna system 110-*a* may be one-way or two-way capable and designed with adequate transmit power and receive sensitivity to communicate reliably with the first satellite 105-*a*. The first satellite 105-*a* may communicate with the first gateway antenna system 110-*a* by sending and receiving signals through one or more beams 160-*a*. The first gateway 115-*a* sends and receives signals to and from the first satellite 105-*a* using the first gateway antenna system 110-*a*. The first gateway 115-*a* is connected to the first network 120-*a*. The first network 120-*a* may include a local area network (LAN), metropolitan area network (MAN), wide area network (WAN), or any other suitable public or private network and may be connected to other communications networks such as the Internet, telephony networks (e.g., Public Switched Telephone Network (PSTN), etc.), and the like.

Examples of satellite communications system 100 may include the second satellite 105-*b*, along with either unique or shared associated system components. For example, the second gateway antenna system 110-*b* may be one-way or two-way capable and designed with adequate transmit power and receive sensitivity to communicate reliably with the second satellite 105 *b*. The second satellite 105-*b* may communicate with the second gateway antenna system 110-*b* by sending and receiving signals through one or more beams 160-*b*. The second gateway 115-*b* sends and receives signals to and from the second satellite 105-*b* using the second gateway antenna system 110-*b*. The second gateway 115-*b* is connected to the second network 120-*b*. The second network 120-*b* may include a local area network (LAN), metropolitan area network (MAN), wide area network (WAN), or any other suitable public or private network and may be connected to other communications networks such as the Internet, telephony networks (e.g., Public Switched Telephone Network (PSTN), etc.), and the like.

In various examples, the first network 120-*a* and the second network 120-*b* may be different networks, or the same network 120. In various examples, the first gateway 115-*a* and the second gateway 115-*b* may be different gateways, or the same gateway 115. In various examples, the first gateway antenna system 110-*a* and the second gateway antenna system 110-*b* may be different gateway antenna systems, or the same gateway antenna system 110.

The aircraft 130 can employ a communication system including a multi-band antenna 140 described herein. The multi-band antenna 140 can include a multi-band feed assembly oriented to illuminate a reflector 143. In the illustrated example, the multi-band feed assembly includes a first feed 142 and a second feed 142. Alternatively, the number of feeds in the multi-band feed assembly may be greater than two. In some examples, the first feed 141 and/or the second feed 142 can be a dual polarized feeds. The antenna 140 can be mounted on the outside of the aircraft 130 under a radome (not shown). The antenna 140 may be mounted to an antenna assembly positioning system (not shown) used to point the antenna 140 to a satellite 105 (e.g., actively tracking) during operation. In some examples, antenna assembly positioning system can include both a system to control an azimuth orientation of an antenna, and a system to control an elevation orientation of an antenna.

The first feed 141 may be operable over a different frequency band than the second feed 142. The first feed 141 and/or the second feed 142 may operate in the International Telecommunications Union (ITU) Ku, K, or Ka-bands, for example from approximately 17 to 31 Giga-Hertz (GHz). Alternatively, the first feed 141 and/or the second feed 142 may operate in other frequency bands such as C-band, X-band, S-band, L-band, and the like. In a particular example, the first feed 141 can be configured to operate at Ku-band (e.g. receiving signals between 10.95 and 12.75 GHz, and transmitting signals between 14.0 to 14.5 GHz), and the second feed 142 can be configured to operate at Ka-band (e.g. receiving signals between 17.7 and 21.2 GHz, and transmitting signals between 27.5 to 31.0 GHz). In some examples, the multi-band antenna 140 may include a third feed (not shown). The third feed may for example operate at Q-band transmitting signals between 43.5 to 45.5 GHz and operating in conjunction with the military frequency band segment of Ka-band between 20.2 to 21.2 GHz. However, in the Ka/Q-band operational mode the antenna will need to be oriented towards the satellite with a compromise beam pointing condition for the Ka-band beam and the Q-band beam. Alternatively the third feed can be configured to operate at V-band receiving signals between 71 to 76 GHz and W-band transmitting signals between 81 to 86 GHz with a single beam position for V/W-band operation.

In some examples of the satellite communications system 100, the first feed 141 can be associated with the first satellite 105-*a*, and the second feed 142 can be associated with the second satellite 105-*b*. In operation, the aircraft 130 can have a location that is within a coverage area of the first satellite 105-*a* and/or within a coverage area of the second satellite 105-*b*, and communications using either the first feed 141 or the second feed 142 can be selected based at least in part on the position of the aircraft 130. For instance, in a first mode of operation, while the aircraft 130 is located within a coverage area of the first satellite 105-*a*, the antenna 140 can use the first feed 141 to communicate with the first satellite 105-*a* over one or more first beams 151. In the first mode of operation, the second feed 142 and associated electronics can be in an inactive state without maintaining a communications link with a satellite. In a second mode of operation, while the aircraft 130 is located within a coverage area of the second satellite 105-*b*, the antenna 140 can use the second feed 142 to communicate with the second satellite 105-*b* over one or more second beams 152-*b*. The second mode can be selected, for instance, in response to the aircraft 130 entering a coverage area of the second satellite 105-*b*, and/or leaving a coverage area of the first satellite 105-*a*. In examples where the aircraft is located within an overlapping coverage area of both the first satellite 105-*a* and the second satellite 105-*b*, the second mode can be selected based on other factors, such as network availability, communication capacity, communication costs, signal strength, signal quality, and the like. In the second mode of operation, the first feed 141 and associated electronics can be in an inactive state without maintaining a communications link with a satellite.

In other examples of the satellite communications system 100, the first feed 141 and the second feed 142 can both be associated with the first satellite 105-*a*. In the first mode of operation the antenna 140 can use the first feed 141 to communicate with the first satellite 105-*a* over one or more first beams 151, and in an alternate example of the second mode of operation, the antenna 140 can use the second feed 142 to communicate with the first satellite 105-*a* over one or more second beams 152-*a*. The alternate example of the second mode can be selected to change from a first frequency band and/or communications protocol associated with the first feed 141 to a second frequency band and/or communications protocol associated with the second feed 142.

The communication system of the aircraft 130 can provide communication services for communication devices within the aircraft 130 via a modem (not shown). Communication devices may utilize the modem to connect to and access at least one of the first network 120-*a* or the second network 120-*b* via the antenna 140. For example, mobile devices may communicate with at least one of the first network 120-*a* or the second network 120-*b* via network connections to modem, which may be wired or wireless. A wireless connection may be, for example, of a wireless local area network (WLAN) technology such as IEEE 802.11 (Wi-Fi), or other wireless communication technology.

The size of the antenna 140 may directly impact the size of the radome, for which a low profile may be desired. In other examples, other types of housings are used with the antenna 140. Additionally, the antenna 140 may be used in other applications besides onboard the aircraft 130, such as onboard boats, automobiles or other vehicles, or on ground-based stationary systems.

Figure 2:
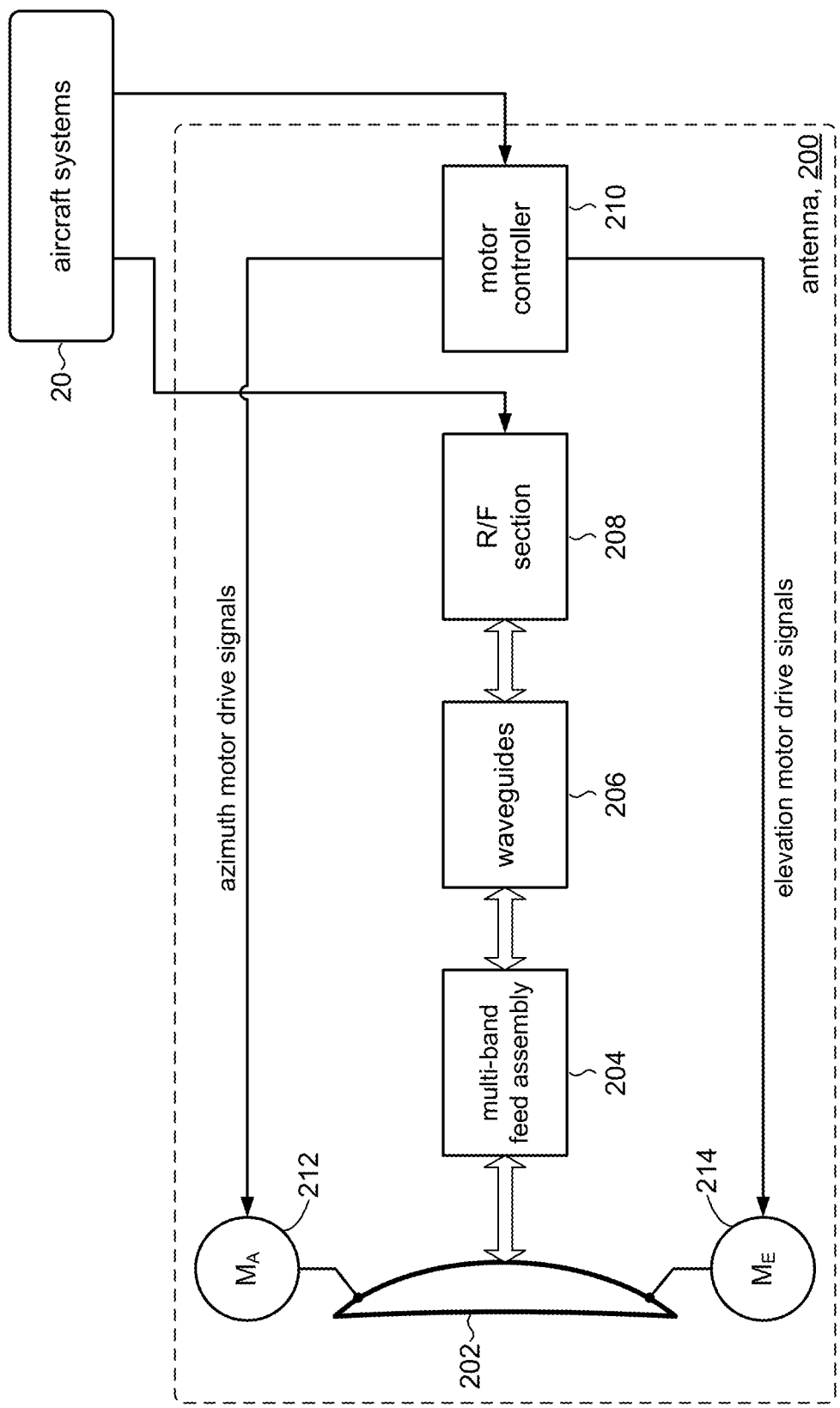
FIG. 2 is a block diagram of an example antenna.

FIG. 2 is a block diagram of an example antenna 200. Antenna 200 may comprise a reflector 202 to transmit and receive signals, for example, with a satellite (e.g., 105, FIG. 1). Signal handling components in the antenna 200 may include a multi-band feed assembly 204, a waveguide section 206, and a radio frequency (RF) section 208. As described in more detail below, the multi-band feed assembly 204 includes multiple feeds operable over different frequency bands. In embodiments described herein, the reflector 202 is the only reflector of the antenna 200. In other words, antenna 200 has single reflector 202, such that the feeds of the multi-band assembly 204 directly illuminate the single reflector 202. For discussion purposes going forward, each feed of the multi-band feed assembly 204 may be described as a dual-circularly polarized feed. More generally, a feed may be dual-linearly polarized, dual-circularly polarized, etc. The antenna 200 may include components to position the antenna 200. In some embodiments, for example, the positioning components may include a motor controller 210, an azimuth motor 212 to rotate the pointing direction of antenna 200 along the azimuth, and an elevation motor 214 to rotate the angle of elevation of antenna 200.

The antenna 200 may be used in any suitable communications system. In a particular embodiment, for example, the antenna 200 may be provisioned in an aircraft system 20. The R/F section 208 may receive communications from the aircraft system 20 for transmission by the antenna 200, and may provide received communications to the aircraft system 20. Similarly, the antenna 200 may receive positioning information from the aircraft systems 20 to point the antenna 200.

Figure 3:
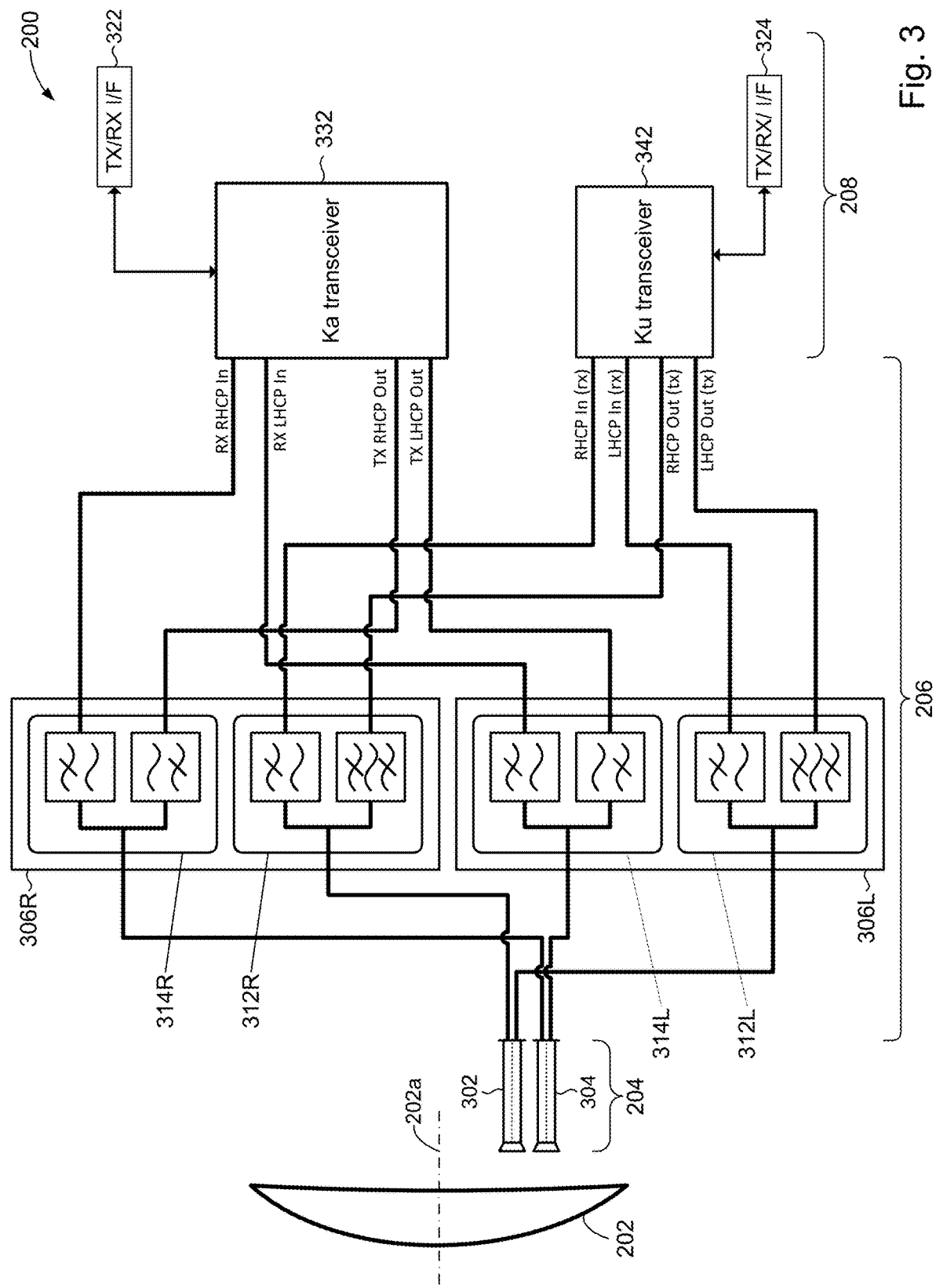
FIG. 3 is a more detailed block diagram of the example antenna of FIG. 2.

FIG. 3 is a more detailed block diagram of the antenna 200 of FIG. 2. In accordance with some embodiments of the present disclosure, for example, the multi-band feed assembly 204 may comprise a first feed 302 and a second feed 304. In some embodiments, the first and second feeds 302, 304 may be offset feeds. In other words, the first and second feeds 302, 304 may not be aligned along the central axis 202*a* of reflector 202, but rather may be offset from the axis 202*a*. Although two feeds 302, 304 are shown, embodiments in accordance with the present disclosure may include more than two feeds.

In some embodiments, the first feed 302 may transmit and receive signals in a first frequency band. In a particular embodiment, for example, the first feed 302 may operate in the Ku band. In some embodiments, the second feed 304 may transmit and receive signals in a second frequency band different from the first frequency band. In a particular embodiment, for example, the second prime focus feed 304 may operate in the Ka band. Additional details of the first and second feeds 302, 304 will be discussed in more detail below. Embodiments in accordance with the present disclosure may operate in multiple (two or more) frequency bands. However, for discussion purposes going forward, dual band operation of the first and second feeds 302, 304 in the Ku and Ka bands, respectively, may be described without loss of generality.

In some embodiments, the waveguide section 206 may include a system of waveguides that couple or otherwise connect the RF section 208 with the multi-band feed assembly 204. In some embodiments, such as shown in FIG. 3 for example, the waveguide section 206 may include waveguides 312R, 312L coupled between the RF section 208 and the first feed 302 to guide signals (to be transmitted or received) in the Ku band between the RF section 208 and the first feed 302. In some embodiments, for example, waveguide 312R may be a diplexer that carries right-hand circularly polarized signals (right-hand circular polarization, RHCP) in the Ku band. Likewise in some embodiments, waveguide 312L may be a diplexer that carries left-hand circular polarization (LHCP) in the Ku band.

The waveguide section 206 may further include waveguides 314R, 314L coupled between the RF section 208 and the second feed 304 to guide signals in the Ka band between the RF section 208 and the second feed 304. In some embodiments, for example, waveguide 314R may be a diplexer that carries right-hand circular polarization in the Ka band, and waveguide 314L may be a diplexer that carries left-hand circular polarization in the Ka band.

In a particular embodiment, the waveguides 312R, 312L, 314R, 314L may be arranged in two subassemblies 306R, 306L. The subassembly 306R, comprising the waveguide 312R (Ku band) and the waveguide 314R (Ka band), may be a diplexer assembly configured to guide right-hand circularly polarized signals. Likewise, subassembly 306L, comprising the waveguide 312L (Ku band) and the waveguide 314L (Ka band), may be a diplexer assembly to guide left-hand circularly polarized signals. In alternative embodiments, the waveguides 312R, 312L, 314R, 314L can be arranged in other configurations.

The RF section 208 may include interfaces 322, 324 to communicate with a backend communication system (e.g., aircraft system 20, FIG. 2) to receive communications for transmission by antenna 200 and to provide communications received by the antenna 200. In some embodiments, for example, interface 322 may be configured to provide and receive Ka band-type communications with the backend communication system. Interfaces 324 likewise, may provide and receive Ku band-type communications with the backend communication system.

The RF section 208 may further include a transceiver 332 to support transmission and reception of signals in the Ka band. In some embodiments, for example, the transceiver 332 may include an input port coupled to diplexer 314R to receive right-hand circularly polarized signals from antenna 200. The transceiver 332 may include another input coupled to diplexer 314L to receive left-hand circularly polarized signals from antenna 200. The transceiver 332 may process the received signals (e.g., filter, amplify, downconvert) to produce a return signal that can be provided via interface 322 to the backend communication system.

The transceiver 332 may process (e.g., upconvert, amplify) communications received from the backend communication system to produce signals for transmission by antenna 200. In some embodiments, for example, the transceiver 332 may generate right-hand and left-hand circularly polarized signals at its output ports. The output ports may be coupled to diplexers 314R and 314L to provide the amplified signals for transmission by antenna 200.

The RF section 208 may further include a transceiver 342 to support transmission and reception of signals in the Ku band. In some embodiments, for example, the transceiver 342 may include an input port coupled to diplexer 312R to receive right-hand circularly polarized signals received by antenna 200. Another input port may be coupled to diplexer 312L to receive left-hand circularly polarized signals received by antenna 200. The transceiver 342 may process the received signals (e.g., filter, amplify, downconvert) to produce a return signal that can be provided via interface 326 to the backend communication system.

The transceiver 342 may process (e.g., upconvert, amplify) communications received via interface 324 from the backend communication system to produce signals for transmission by antenna 200. In some embodiments, the transceiver 342 may generate right-hand and left-hand circularly polarized transmit signals at output ports coupled to diplexers 312R and 312L for transmission by antenna 200.

Figure 4:
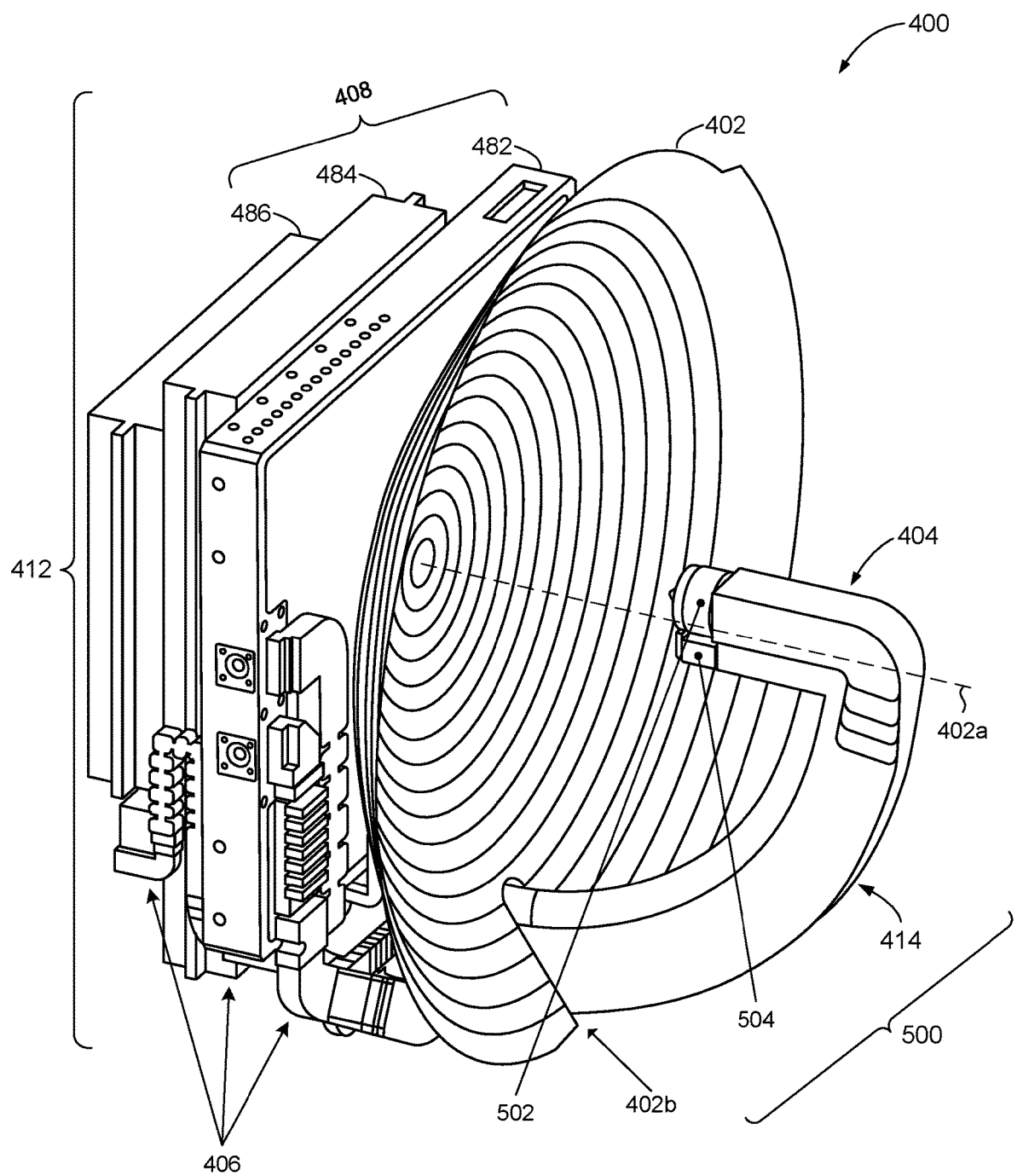
FIG. 4 illustrates a perspective view of an example antenna.

FIG. 4 illustrates a perspective view of an example antenna 400. The antenna 400 may include a reflector 402. In some embodiments, the reflector 402 may be a parabolic reflector. In a particular design, for example, the reflector 402 may have a diameter D of about 11.45". The focal length F may be selected to achieve an F/D ratio of about 0.32. It will be appreciated that these parameters will be different for different designs.

In various embodiments, the reflector 402 may have any spherical, aspherical, bi-focal, or offset concave shaped profile necessary for the generation of desired transmission and receiving beams. In the illustrated embodiment, the reflector 402 is the single reflector of the antenna 400, such that multi-band feed assembly 400 directly illuminates the reflector 402. In some embodiments, the reflector 402 may be used in conjunction with one or more additional reflectors in a system of reflectors (not shown). The system of reflectors may be comprised of one or more profiles such as parabolic, spherical, ellipsoidal, or other shaped profile, and may be arranged in classical microwave optical arrangements such as Cassegrain, Gregorian, Dragonian, offset, side-fed, front-fed, or other similarly configured arrangements. The reflector 402 may also be substituted with other types of directly illuminated focusing apertures. In an alternate embodiment, the multi-band feed assembly 400 directly illuminates a lens aperture (not shown). The use of reflective or transmissive microwave optics as dual or complementary focusing aperture systems may also be used.

The antenna 400 may include a multi-band feed assembly 404. In the particular embodiment shown in FIG. 4, for example, the multi-band feed assembly 404 is configured as a prime focus feed. In other words, the feed assembly 404 may be positioned in front of the reflector 402 to directly illuminate the reflector 402 and aligned along an axis (central axis) 402a of the reflector 402. As will be explained in more detail below, in accordance with the some embodiments of the present disclosure, the feed assembly 404 may have a dual feed construction comprising feeds 502, 504 (FIG. 6A) that are offset from the reflector axis 402a. Accordingly, the feed assembly 404 may be regarded as a prime focus offset feed assembly.

A support member (waveguide spar) 414 may be coupled to or otherwise integrated with the feed assembly 404 to provide support for the feed assembly 404. In accordance with the present disclosure, the support member 414 may also serve as a waveguide to propagate signals to and from the feed assembly 404. In accordance with some embodiments of the present disclosure, the support member 414 may extend through an opening 402b formed at the periphery of reflector 402. In a particular embodiment, the support member 414 may have an arcuate shape that passes through opening 402b of reflector 402 and toward reflector axis 402a. The support member 414 may include one or more features (discussed in more detail below with respect to FIGS. 6A-6B) for minimizing the scattering interaction between the reflector 402 and support member 414. Similar treatment (not shown) may be included to behave as a transition on the opposite surface (outboard) side of the support member in the form of a shape taper. Such an arrangement can reduce the swept volume of the antenna 400 as compared to extending the support member 414 around the periphery of the reflector 402. The combination of feed assembly 404 and support member 414 may constitute a waveguide assembly 500, discussed in more detail below in connection with FIGS. 5A and 5B.

In accordance with the present disclosure, the antenna 400 may include an RF & waveguide package 412 mounted on or otherwise affixed adjacent the rear side of the reflector 402. The RF & waveguide package 412 may include an RF section 408. In some embodiments, for example, the RF section 408 may include a first transceiver module 482 (e.g., Ku transceiver module 342, FIG. 3), a power amplifier module 484, and a second transceiver module 486 (e.g., Ka transceiver 332, FIG. 3). In accordance with the present disclosure, the RF & waveguide package 412 may further include waveguide components 406 that couple the modules of the RF section 408 with the feed assembly 404, in conjunction with the support member 414.

Figure 5A:
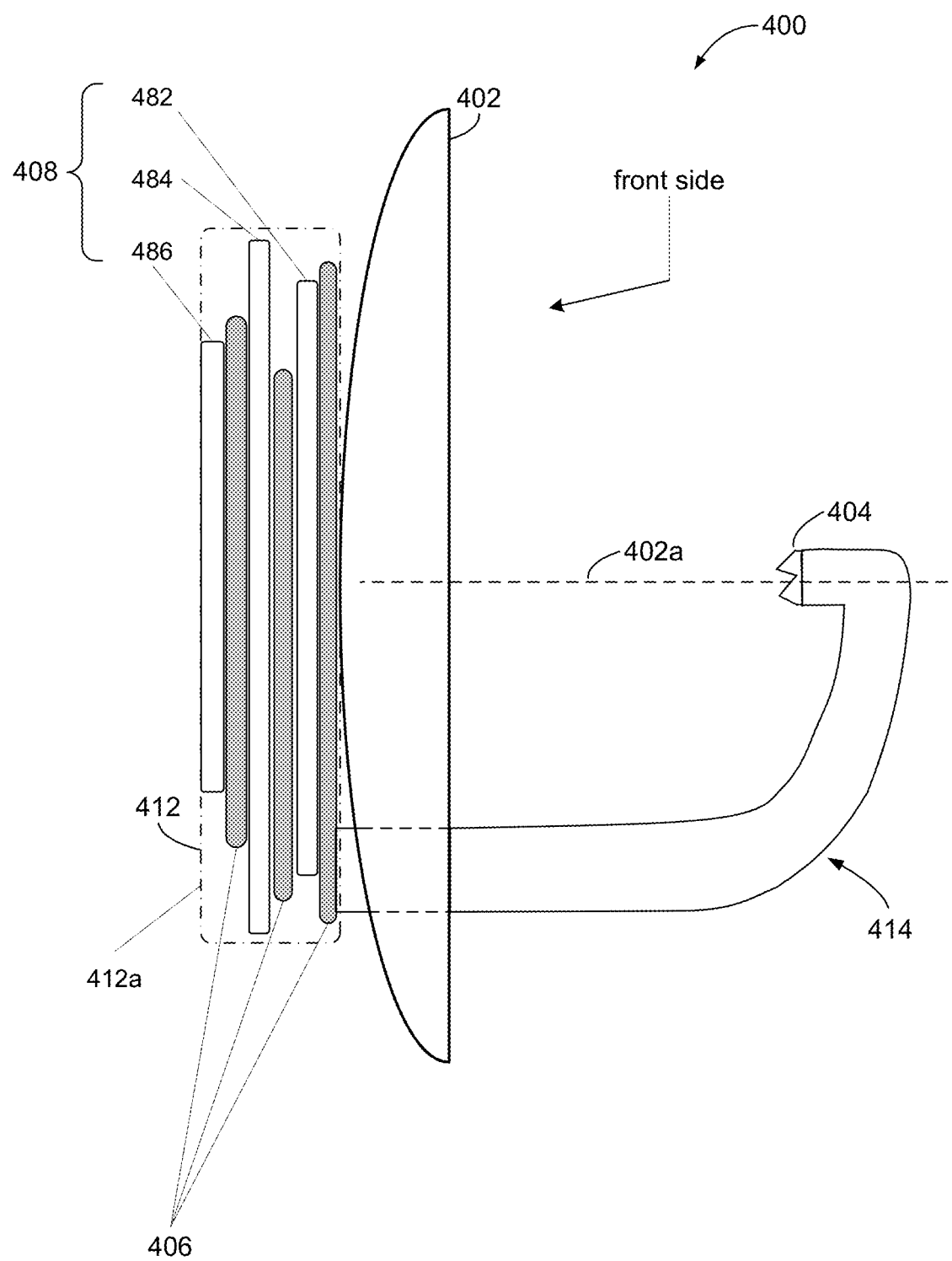
FIGS. 5A and 5B illustrate different views of an example antenna.

FIG. 5A shows a side view of antenna 400, illustrating the compact packaging design of the RF & waveguide package 412 in accordance with the present disclosure. In order to achieve a low profile packaging design, the respective circuitry for each module in the RF section 408 (e.g., first transceiver module 482, power amplifier module 484, second transceiver module 486) may be laid out on a single printed circuit board (PCB, not shown). Likewise, the waveguide components 406 may include waveguides (shown below) having a low-profile design to provide connectivity between the modules in the RF section 408 and the feed assembly 404, and fits within a package outline 412a of the RF & waveguide package 412. Examples of such waveguides are described below.

Figure 5B:
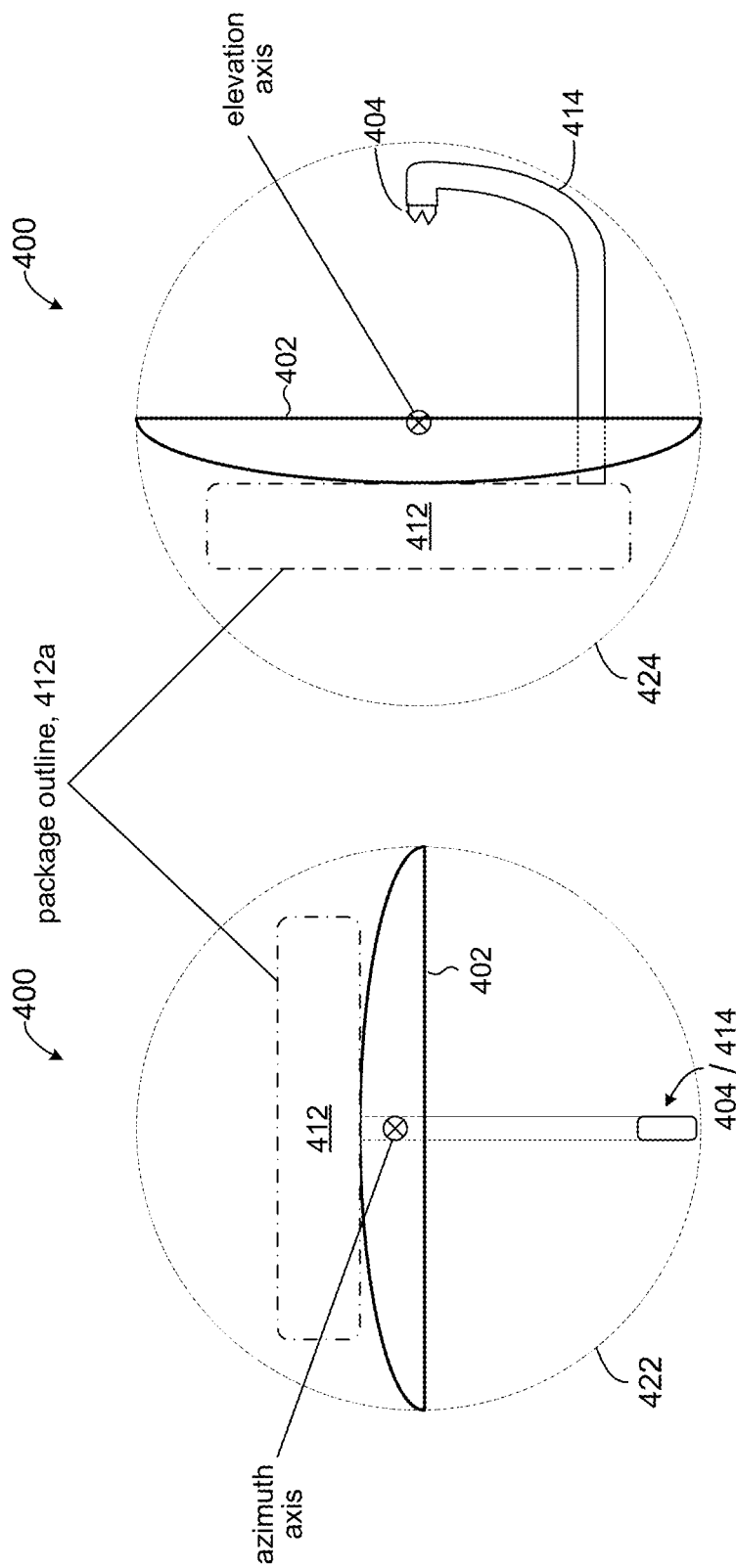

Referring to FIG. 5B, the combined volume of space swept out by antenna 400 when it is rotated about all it axes of rotation (e.g., azimuthal axis, elevational axis, etc.) establishes a sweep volume (or swept volume) of the antenna 400. Likewise, the reflector 402 may define a first swept volume 422 when rotated about an azimuth axis and a second swept volume 424 when rotated about an elevation axis. The combination of the first and second swept volumes 422, 424 shown in FIG. 5B may establish a sweep volume of reflector 402. The sweep volume of reflector 402 may have a spherical shaped volume, and in general may be any shape depending on the number of axes of rotation and the relative location of the axes of rotation. In accordance with the present disclosure, the RF & waveguide package 412 may have a compact form factor that fits within the sweep volume (e.g., defined by sweep volumes 422, 424) of the reflector 402. FIG. 5B, for example, shows that the package outline 412a of the RF & waveguide package 412 fits within the sweep volumes 422, 424 of reflector 402.

Figure 6A:
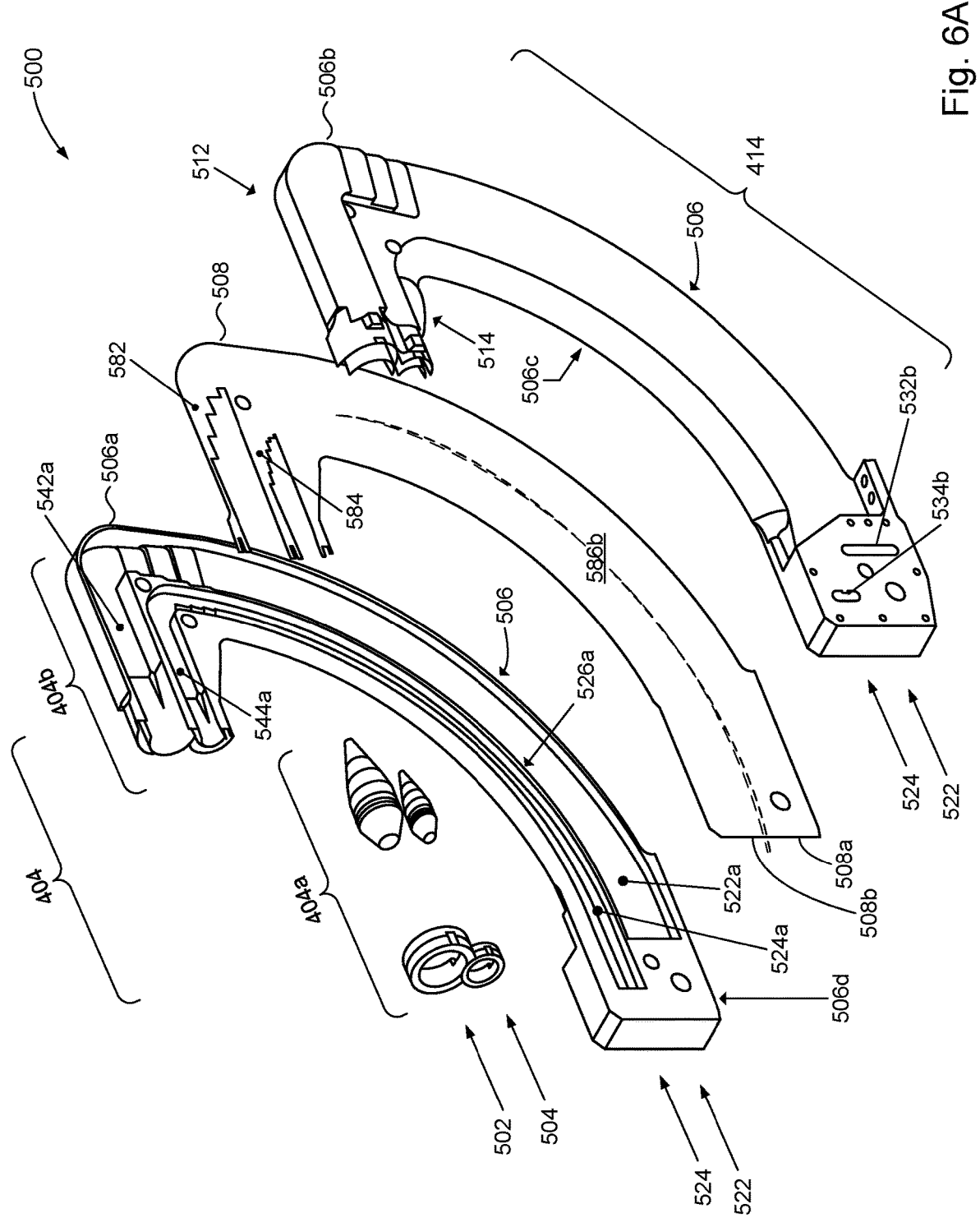
FIGS. 6A and 6B illustrate different expanded views of an example feed assembly and support structure for an antenna.
Figure 6B:
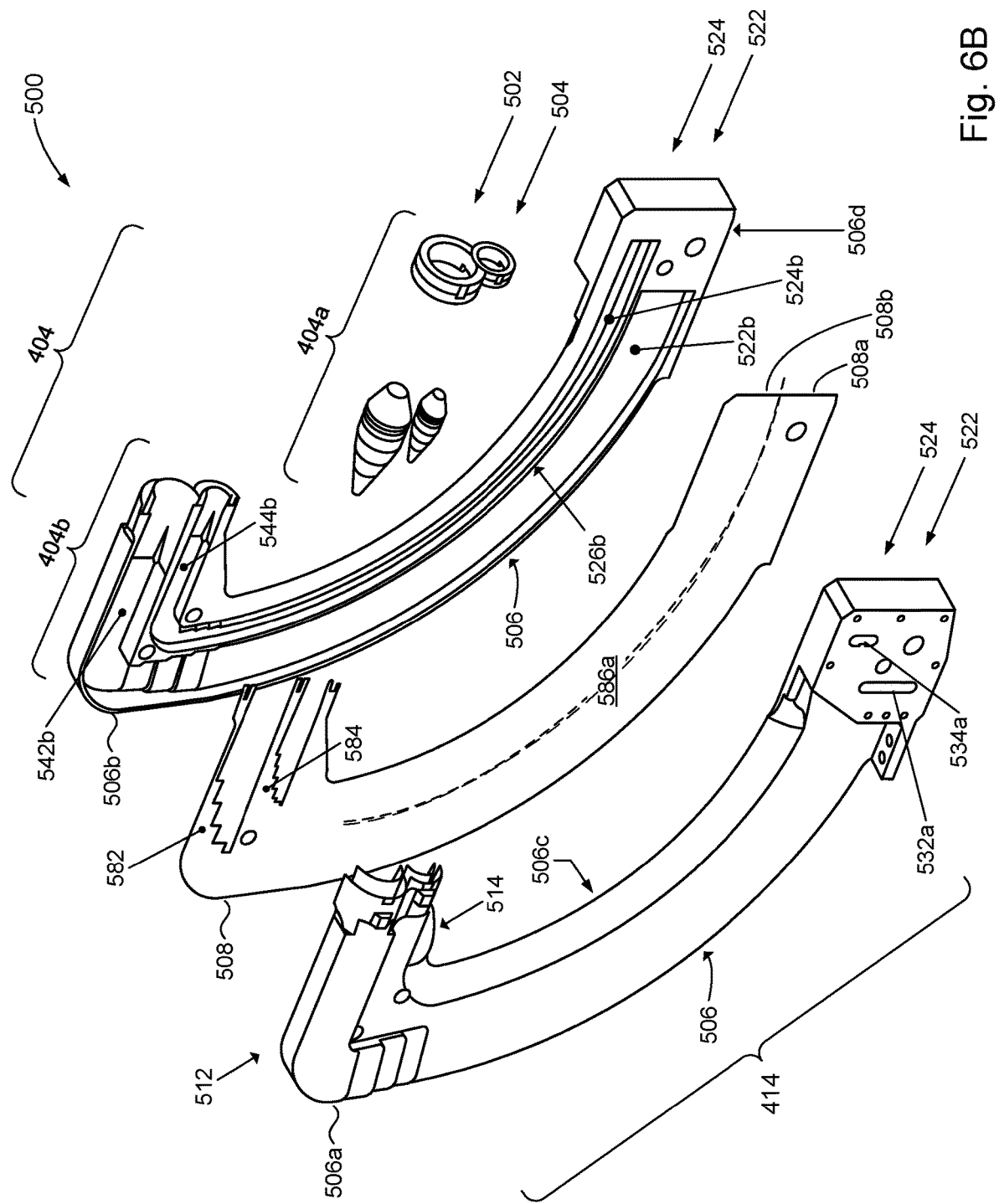

FIGS. 6A and 6B show an exploded view of waveguide assembly 500, illustrating additional details of the waveguide assembly 500 in accordance with the present disclosure. FIGS. 5A and 5B illustrate the components of waveguide assembly 500 from opposite perspectives.

In accordance with the present disclosure, a portion of the waveguide assembly 500 may constitute the feed assembly 404. In some embodiments, the feed assembly 404 may include a dual-feed sub-assembly 404a comprising a first dielectric insert 502 of a first feed 512 and a second dielectric insert 504 of a second feed 514. The first and second feeds 512, 514 may be conjoined or otherwise mechanically connected together. In some embodiments, the first and second dielectric inserts 502, 504 may be conjoined along the reflector axis 402a (FIG. 4).

The feed assembly 404 may further include a dual-port sub-assembly 404b coupled to or otherwise integrated with the dual-feed sub-assembly 404a. In some embodiments, the dual-port sub-assembly 404b may include portions of first feed 512 and second feed 514. The first dielectric insert 502 may be part of the first feed 512 and, likewise, the second dielectric insert 504 may be part of the second feed port 514. The first feed 512 may be configured for operation over a first frequency band. In some embodiments, for example, the first feed port 512 may be configured for operation in the Ku band. The second feed 514 may be configured for operation over a second frequency band. In some embodiments, for example, the second feed 514 may be configured for operation in the Ka band.

In accordance with the present disclosure, a portion of the waveguide assembly 500 may constitute the support member 414, integrated with the feed assembly 404 to support the feed assembly 404. In accordance with the present disclosure, the support member 414 may comprise a first pair of waveguides 522 of first feed 512 and a second pair of waveguides 524 of second feed 514 and partially encircled by the first pair of waveguides 522. As will be explained in more detail below, the first and second pairs of waveguides 522, 524 may couple to the waveguide components 406 (FIG. 4) for propagation of signals between the first and second feeds 512, 514 and the RF section 408 (FIG. 4).

In the illustrated embodiment, the waveguide assembly 500 is a layered structure. In some embodiments, for example, the waveguide assembly 500 may comprise a housing 506 comprising a first housing layer 506a and a second housing layer 506b. The view in FIG. 6A shows interior details of the first housing layer 506a, while opposite view in FIG. 6B shows interior details of the second housing layer 506b. The waveguide assembly 500 may include a septum layer 508 disposed between the first housing layer 506a and the second housing layer 506b.

In some embodiments, the housing 506 may define the first feed 512 and a second feed 514. For example, the first feed 512 may comprise a first port chamber 542a (FIG. 6A) formed in the first housing layer 506a and a second port chamber 542b (FIG. 6B) formed in the second housing layer 506b. The first feed 512 may further include a first septum polarizer 582 formed in the septum layer 508. The first septum polarizer 582 may be disposed between the first and second port chambers 542a, 542b. Likewise, the second feed 514 may comprise a first port chamber 544a (FIG. 6A) formed in the first housing layer 506a and a second port chamber 544b (FIG. 6B) formed in the second housing layer 506b. The second feed 514 may further include a second septum polarizer 584 formed in the septum layer 508. The second septum polarizer 584 may be disposed between the first and second port chambers 544a, 544b of the second feed 514. In the illustrated embodiment, the first septum polarizer 582 and second septum polarizer 584 may be co-planar.

In some embodiments, the housing 506 may define the first pair of waveguides 522 and the second pair of waveguides 524 that comprise the support member 414. For example, the first pair of waveguides 522 may comprise a first waveguide 522a (FIG. 6A) formed in the first housing layer 506a and a second waveguide 522b (FIG. 6B) formed in the second housing layer 506b. Similarly, the second pair of waveguides 524 may comprise a first waveguide 524a (FIG. 6A) formed in the first housing layer 506a and a second waveguide 524b (FIG. 6B) formed in the second housing layer 506b.

The first waveguide 522a of the first pair of waveguides 522 and the first waveguide 524a of the second pair of waveguides 524 formed in the first housing layer 506a may be separated by a wall 526a formed in the first housing layer 506a. Likewise, the second waveguide 522b of the first pair of waveguides 522 and the second waveguide 524b of the second pair of waveguides 524 formed in the second housing layer 506b may be separated by a wall 526b formed in the second housing layer 506b. In some embodiments, the walls 526a, 526b may be co-planar or otherwise aligned.

The septum layer 508 may comprise a first portion 508a and a second portion 508b. The first portion 508a may constitute a wall that separates the first and second waveguides 522a, 522b of the first pair of waveguides 522. Similarly, the second portion 508b may constitute a wall that separates the first and second waveguides 524a, 524b of the second pair of waveguides 524. In some embodiments, the wall that separates the first and second waveguides 522a, 522b and the wall that separates the first and second waveguides 524a, 524b may be co-planar.

A surface 586a (FIG. 6A) of the septum layer 508 may constitute a common wall (surface) shared by the first waveguides 522a, 524a. Likewise, a surface 586b (FIG. 6B) of the septum layer 508 may constitute a common wall shared the second waveguides 522b, 524b.

In some embodiments, the housing 506 may include a leading edge 506c having an ogive shape to mitigate generation of side lobe levels in signals reflected from reflector 402 (FIG. 4). In accordance with the present disclosure, a trailing edge 506d of housing 506 may be flat in order to remain within the sweep volume (422, 424, FIG. 4B) defined by the reflector 402.

The housing 506 may include interface flanges 532a, 532b, 534a, 534b for connecting to waveguides. For example, interface flanges 532a, 532b may be connected to waveguides (not shown) for propagating signals in first pair of waveguides 522. Likewise, interface flanges 534a, 534b may be connected to waveguides (not shown) for propagating signals in second pair of waveguides 524. Waveguide examples are provided below.

Figure 7A:
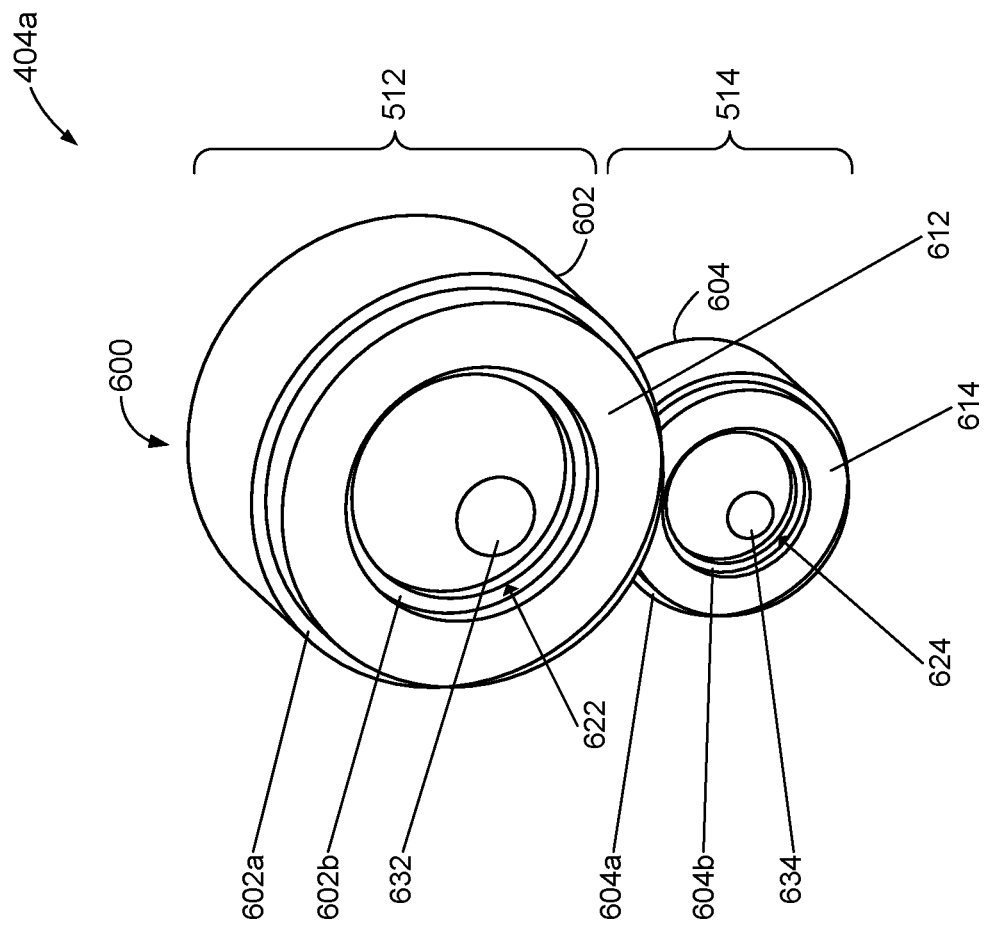
FIGS. 7A and 7B illustrate perspective and side views of an example feed assembly.
Figure 7B:
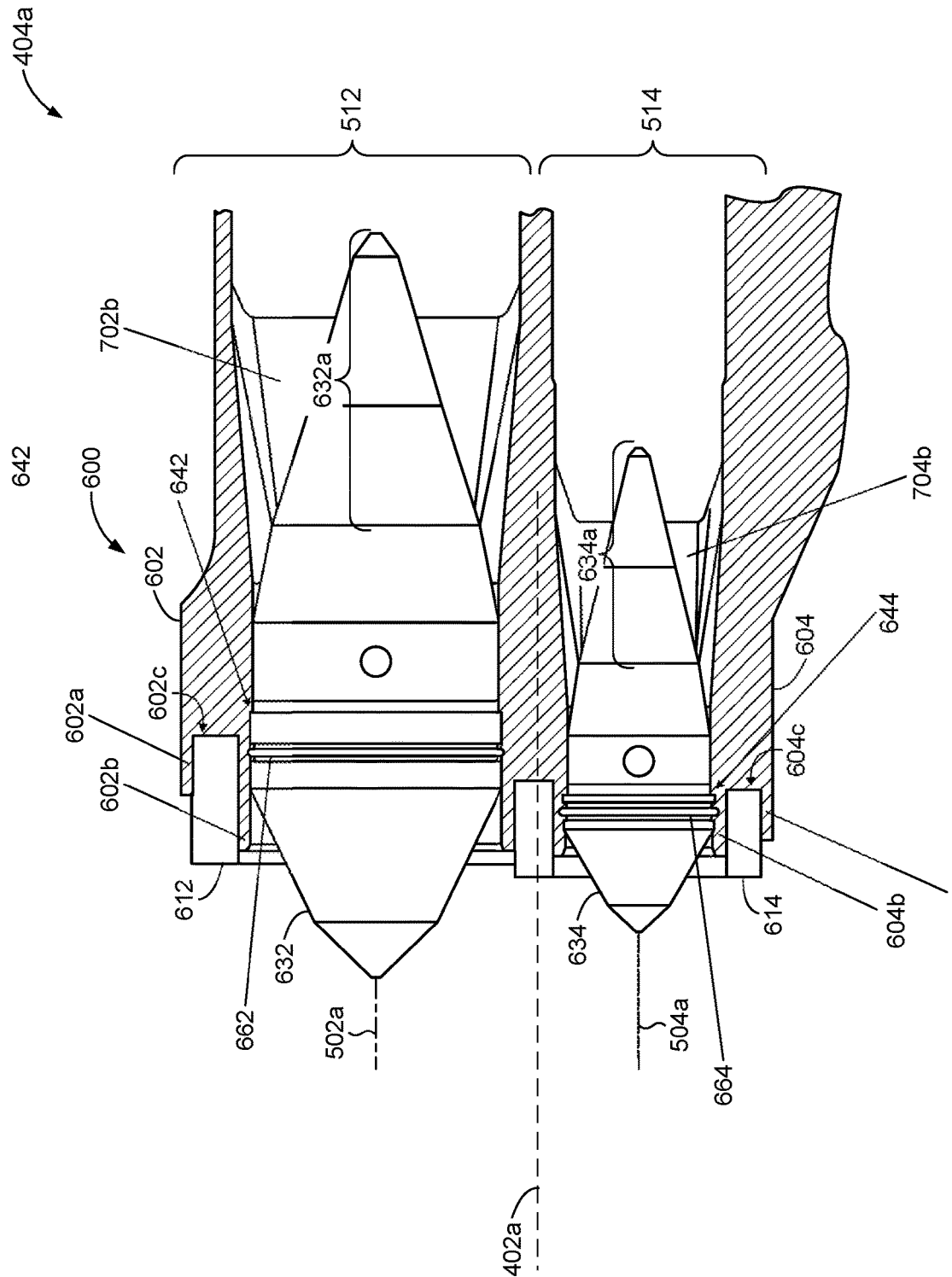

FIGS. 7A and 7B show details of dual-feed sub-assembly 404a in accordance with some embodiments of the present disclosure. In some embodiments, for example, the dual-feed sub-assembly 404a may be constructed by conjoining the first feed 512 and the second feed 514. For example, the dual-feed sub-assembly 404a may comprise a housing 600 having a unibody design that contains the first and second feeds 512, 514. The housing 600 may comprise a first axially corrugated horn having a first annular channel 602 integrated with second axially corrugated horn having a second annular channel 604. The profile view of FIG. 6B illustrates this more clearly. The housing 600 may be any suitable material used in the manufacture of antennas; e.g., brass, copper, silver, aluminum, their alloys, and so on.

The first feed 512 may comprise the first annular channel 602. The first annular channel 602 may be defined by spaced apart concentric annular walls 602a, 602b connected at one end by a bottom surface 602c (FIG. 7B). In some embodiments, the first feed 512 may include an outer dielectric annular member 612 that fits between the annular walls 602a, 602b of the first annular channel 602. The dielectric annular member 612 may improve a cross-polarization characteristic of the first feed 512. Axial alignment of the dielectric annular member 612 may be controlled by the depth of the bottom 602c of the first annular channel 602, acting as a stop. In some embodiments, the inside surface of the annular wall 602a may be corrugated to further improve cross-polarization characteristics of the first feed 502 to control illumination of the reflector 402 (FIG. 4).

The first feed 512 may further include a circular waveguide 622 defined by the inner annular wall 602b of the first annular channel 602. The interior region of the circular waveguide 622 may receive a dielectric insert 632 that extends forward beyond the opening of the circular waveguide 622 and rearward into an interior region of the circular waveguide 622. In some embodiments, a rear portion 632a of the dielectric insert 632 may extend into a transition region 702b (FIG. 8A) of the dual-port subassembly 404b. In some embodiments, the dielectric insert 632 may have a taper or conical profile that tapers in the forward direction and in the rearward direction. The dielectric insert 632 may improve matching to free space and illumination of the reflector 402 (FIG. 4).

The second feed 514, likewise, may comprise the second annular channel 604. The second annular channel 604 may be defined by spaced apart concentric annular walls 604a, 604b connected at one end by a bottom surface 604c (FIG. 7B). In some embodiments, the second feed 514 may include an outer dielectric annular member 614 that fits between the annular walls 604a, 604b of the second annular channel 604. The dielectric annular member 614 may improve a cross-polarization characteristic of the second feed 514. Axial alignment of the dielectric annular member 614 may be controlled by the depth of the bottom 604c of the second annular channel 604, acting as a stop. In some embodiments, the inside surface of the annular wall 604a may be corrugated to further improve cross-polarization characteristics of the second feed 514 to control illumination of the reflector 402 (FIG. 4).

The second feed 514 may further include a circular waveguide 624 defined by the inner annular wall 604b of the second annular channel 604. The interior region of the circular waveguide 624 may receive a dielectric insert 634 that extends forward beyond the opening of the circular waveguide 624 and rearward into an interior region of the circular waveguide 624. In some embodiments, a rear portion 634a of the dielectric insert 634 may extend into a transition region 704b (FIG. 8A) of the dual-port subassembly 404b, described in more detail below. In some embodiments, the dielectric insert 634 may have a taper or conical profile that tapers in the forward direction and in the rearward direction. The dielectric insert 634 may improve matching to free space and illumination of the reflector 402 (FIG. 4). The material for the dielectric inserts 632, 634 may be a plastic such as Rexolite® plastic or Ultem® plastic. In a particular implementation, the dielectric material used for the dielectric inserts 632, 634 is a TPX® plastic.

The use of dielectric components, namely dielectric annular members 612, 614 and dielectric inserts 632, 634, in the construction of the dual-feed sub-assembly 404a allows for a reduction in the size of housings 602, 604 and circular waveguides 622, 624. In some embodiments, where the reflector 402 has a small F/D (e.g., 0.32), the illumination beam should be broad in order to adequately illuminate the reflector 402. The reduced design size of the circular waveguides 622, 624 enabled by the dielectric components allows for the generation of a broad illumination beam. In some embodiments, the use of the dielectric components can improve free space impedance matching of the circular waveguides 622, 624 to improve signal propagation. In some embodiments, the dielectric components may provide some degrees of freedom to control the illumination of the reflector.

FIG. 7B illustrates additional details of the dual-feed sub-assembly 404a. For example the housing 600 may include respective stops 642, 644 to control the axial alignment of the dielectric inserts 632, 634 during manufacture. In some embodiments, for example, the stops 642, 644 may be machined into the housing 600. In some embodiments, O-rings 662 and 664 may be used to retain respective dielectric inserts 632, 634 in position within the housing 600.

FIG. 7B further shows the alignment of the dual-feed sub-assembly 404a relative to the reflector axis 402a in accordance with some embodiments. In some embodiments, the first and second annular channels 602, 604 may both be aligned relative to the reflector axis 402a such that the pointing direction 502a of the first feed 502 will be off-axis with respect to the reflector axis 402a and the pointing direction 504a of the second feed 504, likewise, will be off-axis with respect to the reflector axis 402a.

The embodiment illustrated in FIGS. 7A and 7B comprises a housing 600 having a unibody design. It will be appreciated that in other embodiments, the first feed 512 may a first housing (not shown) that is separate from a second housing (not shown) that comprises the second feed 514. The first and second housings may be mechanically connected or otherwise arranged together to construct the dual-feed subassembly 404a.

Figure 8A:
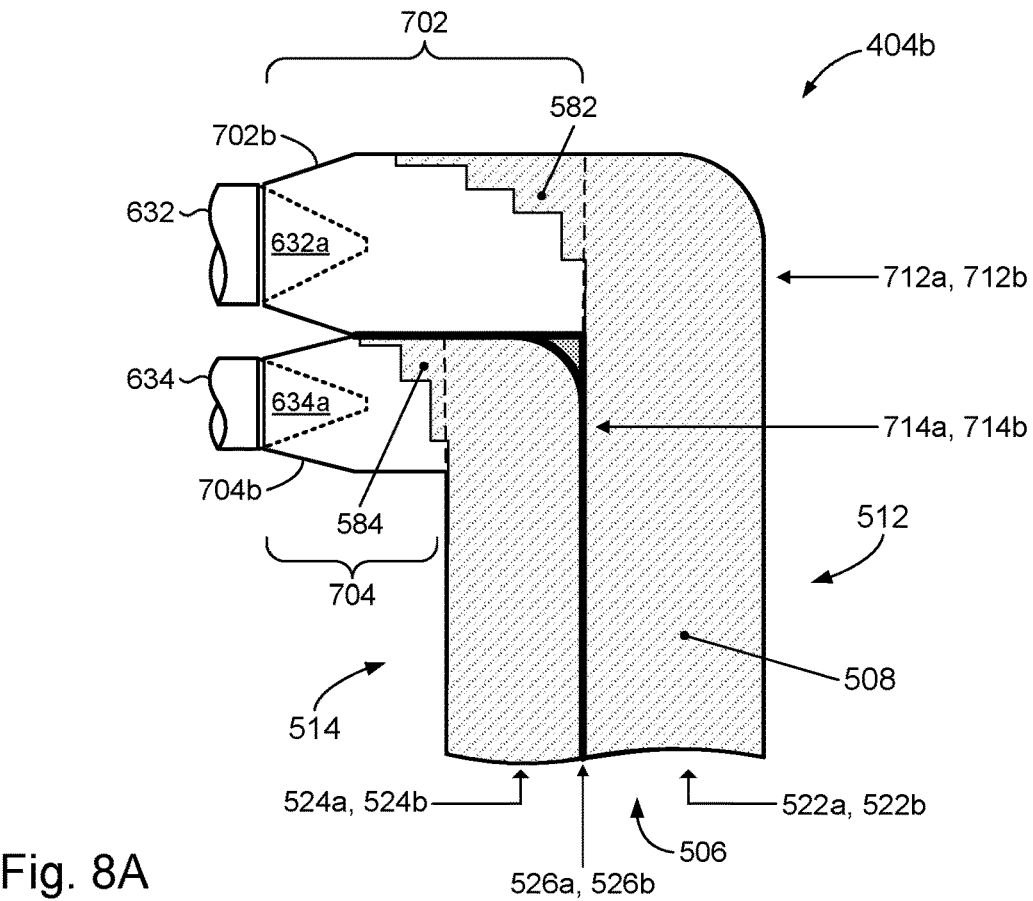
FIGS. 8A and 8B illustrate side and perspective views of an example feed assembly.

The discussion will now turn to a description of the dual-port sub-assembly 404b. FIG. 8A illustrates a profile view of the dual-port subassembly 404b (FIG. 6A). In accordance with the present disclosure, the first feed 512 and the second feed 514 of the dual-port subassembly 404b may be defined by the waveguide assembly housing 506. For example, the first feed 512 may comprise a common waveguide section 702 defined by a portion of the housing 506. The second feed 514, likewise, may comprise a common waveguide section 704 defined by a portion of the housing 506. The first feed 512 may include H-plane waveguide bends 712a, 712b, defined by housing 506, to connect the first and second waveguides 522a, 522b of the first pair of waveguides 522 to respective portions of the common waveguide section 702. The septum polarizer 582 may be convert a signal between one or more polarization states in the common waveguide section 702 and two signal components in the individual waveguides 522a, 522b that correspond to orthogonal basis polarizations (e.g., left hand circularly polarized (LHCP) signals, right hand circularly polarized (RHCP) signals, etc.). The second feed 514 may likewise include H-plane waveguide bends 714a, 714b, defined by housing 506, to connect the first and second waveguides 524a, 524b of the first pair of waveguides 524 to the common waveguide section 704. The septum polarizer 584 may be housed within the common waveguide section 704 to convert a signal between one or more polarization states in the common waveguide section 704 and two signal components in the individual waveguides 524a, 524b that correspond to orthogonal basis polarizations.

Figure 8B:
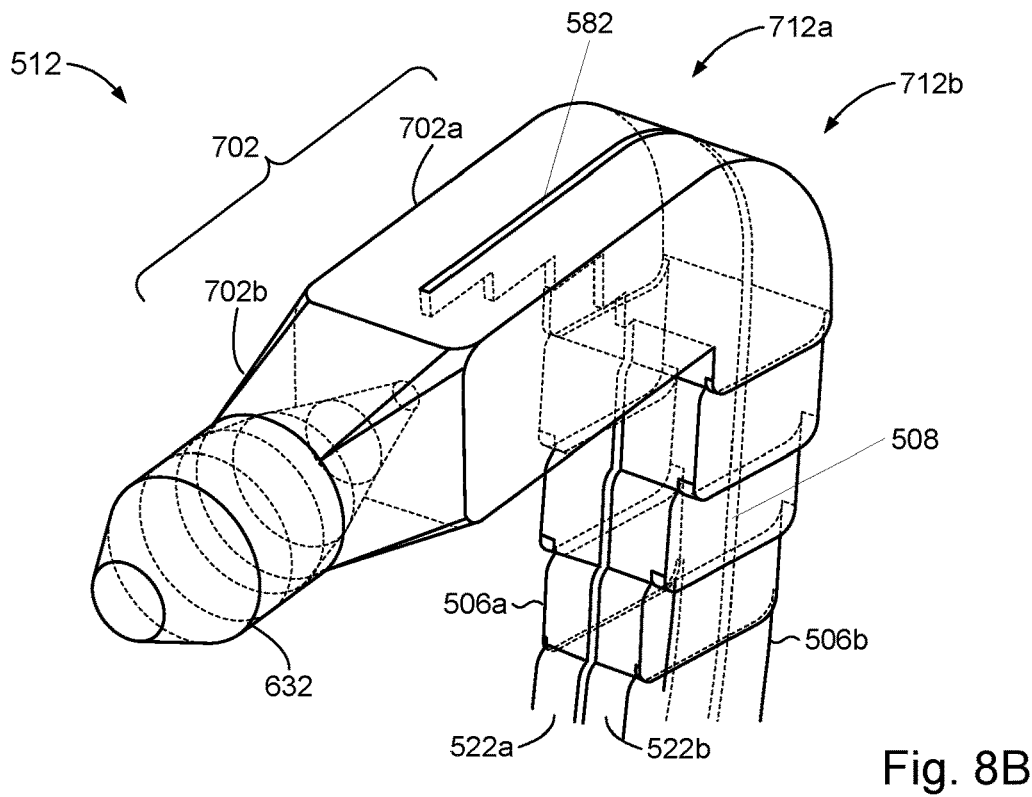

FIG. 8B depicts a perspective view of the first feed 512, illustrating additional details of the first feed 512. It will be understood that the second feed port 514 may have a similar details. FIG. 8B more clearly shows the integration of the first and second waveguides 522a, 522b with respective H-plane waveguides 712a, 712, and the integration of the H-plane bend 712a, 712 with the common waveguide section 702. The septum layer 508 may constitute a common wall between the first and second waveguides 522a, 522b and between the H-plane bends 712a, 712.

In accordance with embodiments of the present disclosure, the common waveguide section 702 may comprise a rectangular region 702a and a transition region 702b. The transition region 702b may provide a transition from the rectangular waveguide of rectangular region 702a to a circular waveguide to correspond to the circular waveguide in the dual-port sub-assembly 404a, defined by the annular wall 602b. As shown in FIG. 7B, the transition region 702b may have a decreasing dimension as the shape of the waveguide transitions from rectangular to circular.

Figure 9:
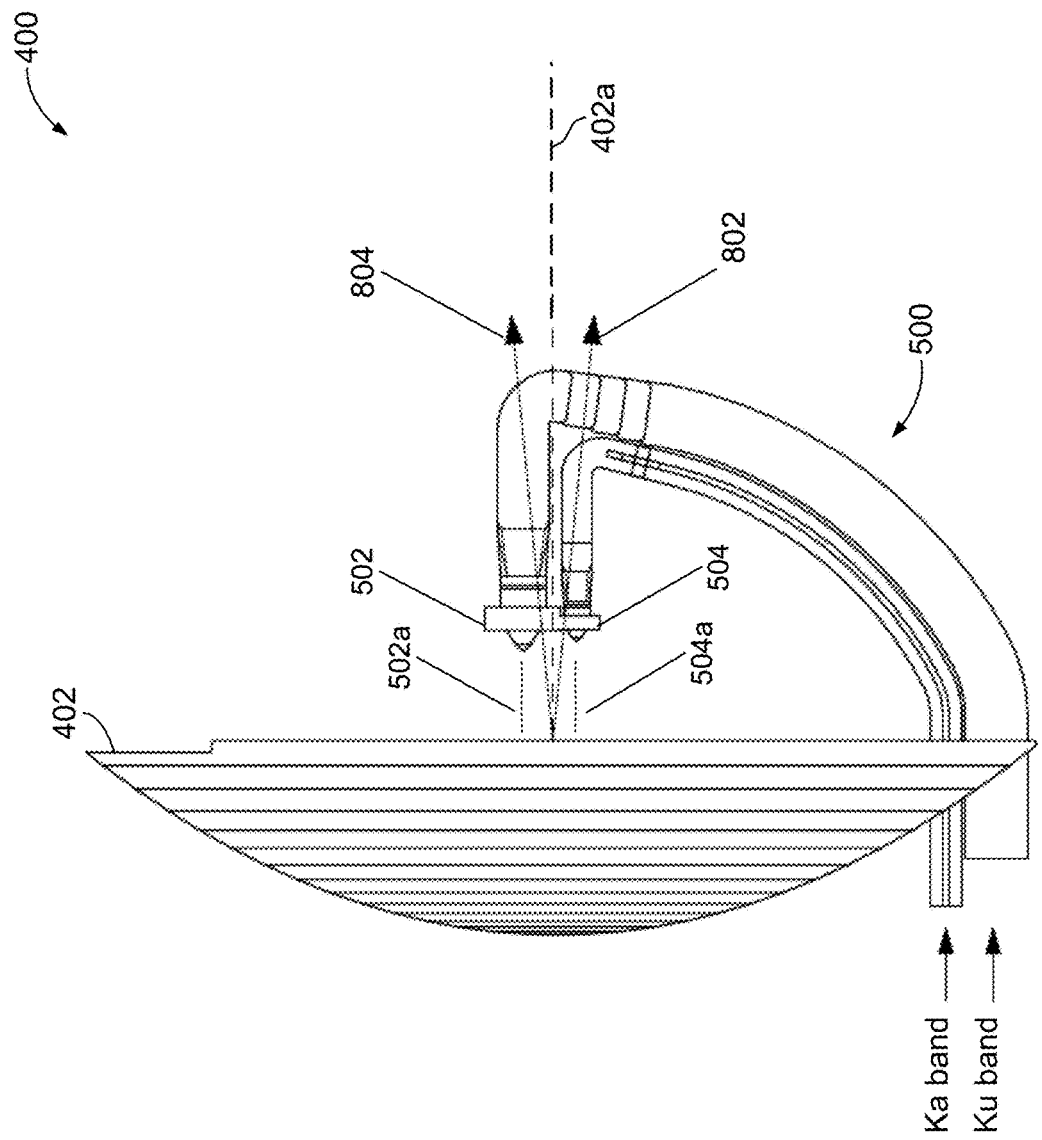
FIG. 9 illustrates beam pointing directions of an example antenna.

FIG. 9 illustrates directions of radiation using an antenna 400 in accordance with the present disclosure. In some embodiments, the feed assembly 404 may directly illuminate the reflector 402. The pointing directions 502a, 504a, respectively, of the first and second feeds 502, 504 may be offset with respect to the reflector axis 402a. In a particular embodiment, for example, the pointing direction 502a of the first feed 502 may lie above the reflector axis 402a. Accordingly, a signal of maximum gain in a first frequency band (e.g., Ku band) may propagate in a beam direction 802 below the reflector axis 402a. Merely as an example, the elevation beam squint may be −3.98° in a given embodiment. Conversely, the pointing direction 504a of the second feed 504 may lie below the reflector axis 402a. Accordingly, a signal of maximum gain in a second band (e.g., Ka band) may propagate in a direction 804 above the reflector axis 402a. Merely as an example, the elevation beam squint may be +2.75° in a given embodiment. Additional feeds (e.g., Q-band or V/W-Bands) may also be located above or below the reflector axis 402a and produce a corresponding beam direction on the opposite side of reflector axis 402a. The location of the feeds relative to the reflector axis is design choice and among the choices can be to locate one feed on the reflector axis or nearer to the axis for a higher frequency band, for example.

Figure 10:
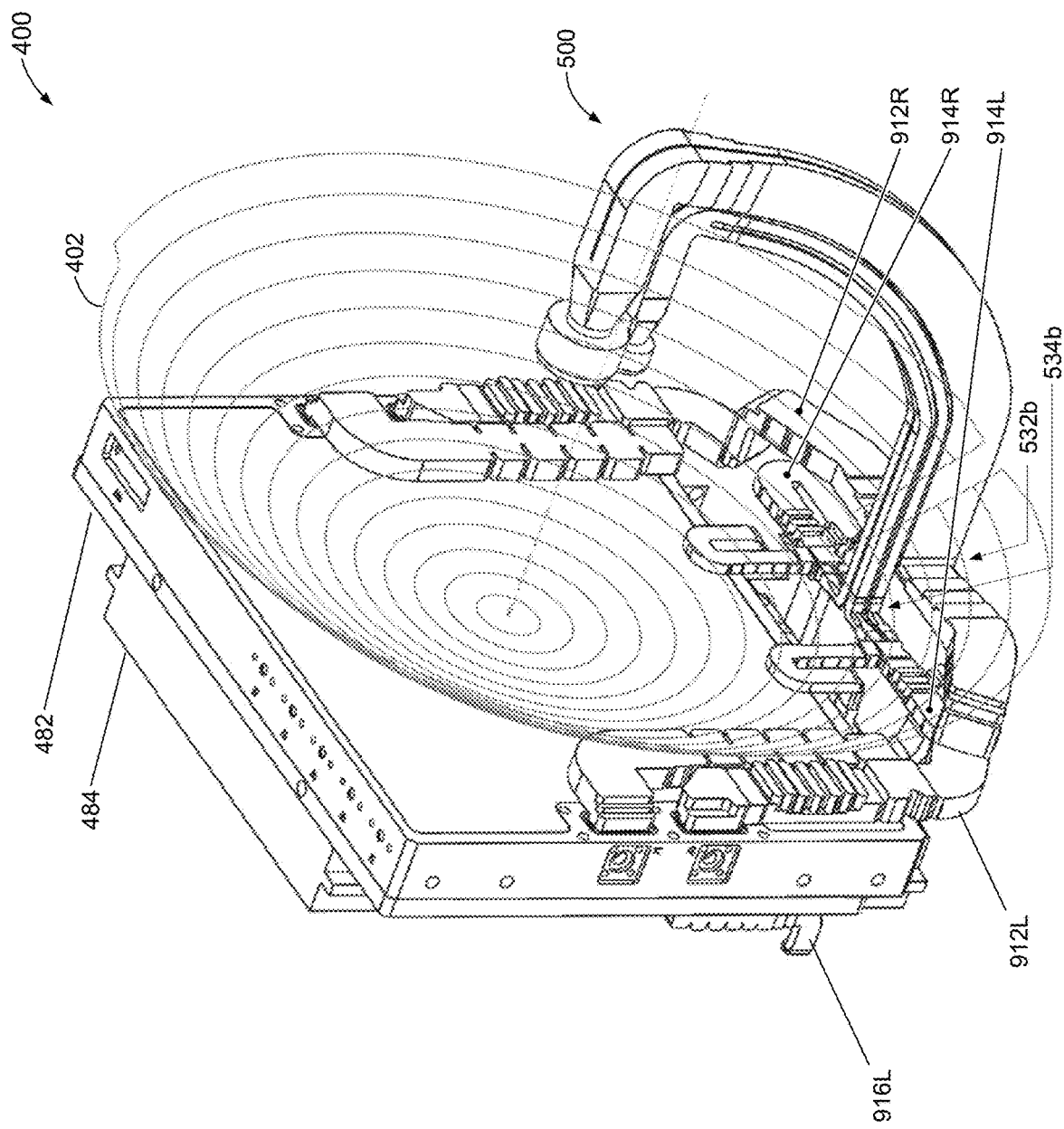
FIGS. 10, 11A, 11B, and 11C present illustrative examples of waveguides in accordance with the present disclosure.

FIG. 10 shows examples, in accordance with the present disclosure, of the waveguides depicted in FIG. 3. Waveguides 312L and 312R in FIG. 3, for example, may be embodied as diplexers 912L and 912R, respectively. Diplexer 912L, for example, may couple the feed assembly 500 (e.g., at interface flange 532b) to the input and output ports of the transceiver module 482 for LHCP signals. Likewise, diplexer 912R may couple the feed assembly 500 (e.g., at interface flange 532a) to input and output ports of the transceiver module 482 for RHCP signals. Likewise, waveguides 314L and 314R in FIG. 3 may be embodied as diplexers 914L and 914R, respectively. Diplexer 914L, for example, may couple the feed assembly 500 (e.g., at interface flange 534b) to an input port of transceiver module 486 (e.g., FIG. 4) and to an output port of power amp 484 for LHCP signals. Likewise, diplexer 914R, for example, may couple the feed assembly 500 (e.g., at interface flange 534a) to an input port of transceiver module 486 (e.g., FIG. 4) and to an output port of power amp 484 for RHCP signals. FIG. 3 shows bandpass filters 336a, 336b. FIG. 9 shows an example of a bandpass filter waveguide at 916L configured to connect the output of the first transceiver module 482 to the power amplifier module 484.

Figure 11A:
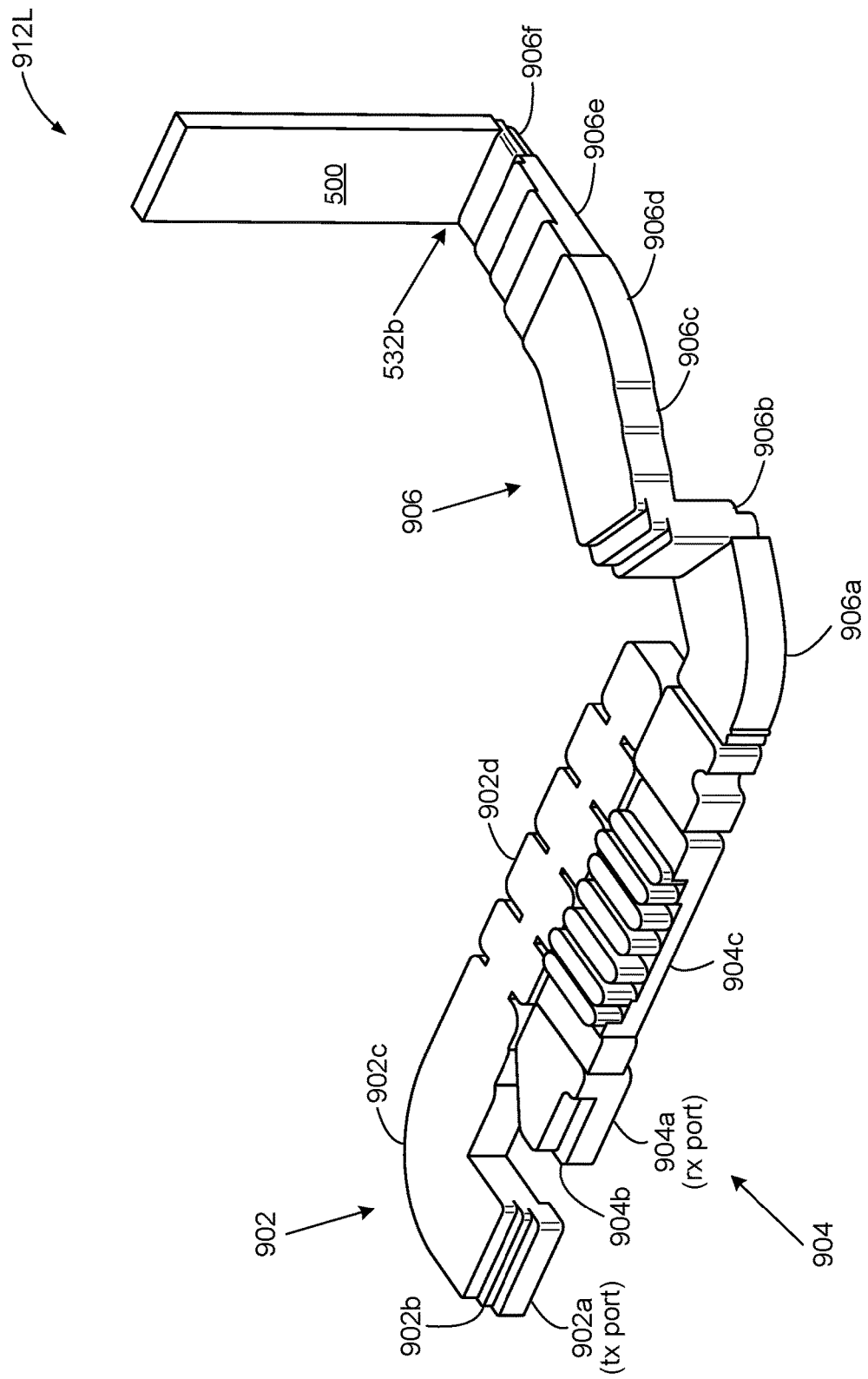

FIG. 11A shows additional details of diplexer 912L in accordance with the present disclosure. It will be understood that the diplexer 912R may have a similar, but mirror-imaged, structure. In some embodiments, diplexer 912L may comprise three waveguide segments 902, 904, 906. Waveguide segment 902 may include a port 902a for coupling to an output (tx) port of the first transceiver module 482 (FIG. 4). An E-plane bend 902b may connect the port 902a to a 90° H-plane bend 902c. The E-plane bend 902b allows for the waveguide segment 902 to remain close to the packaging of the first transceiver module 482 to maintain a small package outline 412a (FIG. 4A). The H-plane bend 902c may connect to a filter 902d. In some embodiments, for example, filter 902d may be a bandpass filter to filter signals to be transmitted to control out of band emissions.

Waveguide segment 904 may include a port 904s for coupling to an input (rx) port of the first transceiver module 482. An E-plane bend 904b may connect the port 904a to a filter 904c, while keeping the waveguide segment 904 close to the packaging of the first transceiver module 482. The filter 904c may be a low pass filter to filter received signals. The filter 902d may connect to filter 904c to combine the two waveguide segments 902, 904.

Waveguide segment 906 is a common waveguide to carry signals that propagate in waveguide segments 902, 904. Waveguide segment 906 may comprise an H-plane bend (e.g., 60° bend) coupled to the filter 904c. An E-plane bend 906b allows the waveguide segment 906 to stay close to the packaging of the first transceiver module 482 while allowing for the waveguide to be routed to the waveguide assembly 500. The waveguide segment 906 may include a waveguide width reduction segment 906c connected to an H-plane bend 906d. The waveguide segment 906 may include a waveguide height reduction segment with an E-plane bend 906e that terminates at port 906f. The port 906f may couple to the waveguide assembly 500 (FIG. 5A), for example, at interface flange 532b of the waveguide assembly 500.

In accordance with the present disclosure, the H-plane bends 902c, 906a, 906d may allow the diplexer 912L to be routed among ports 902a, 904a, 906f while keeping the routing area small. The E-plane bends 902a, 904a, 906b, 906e may allow the diplexer 912L to maintain a low profile within the package outline 412a of the RF & waveguide package 412 (FIG. 5A).

Figure 11B:
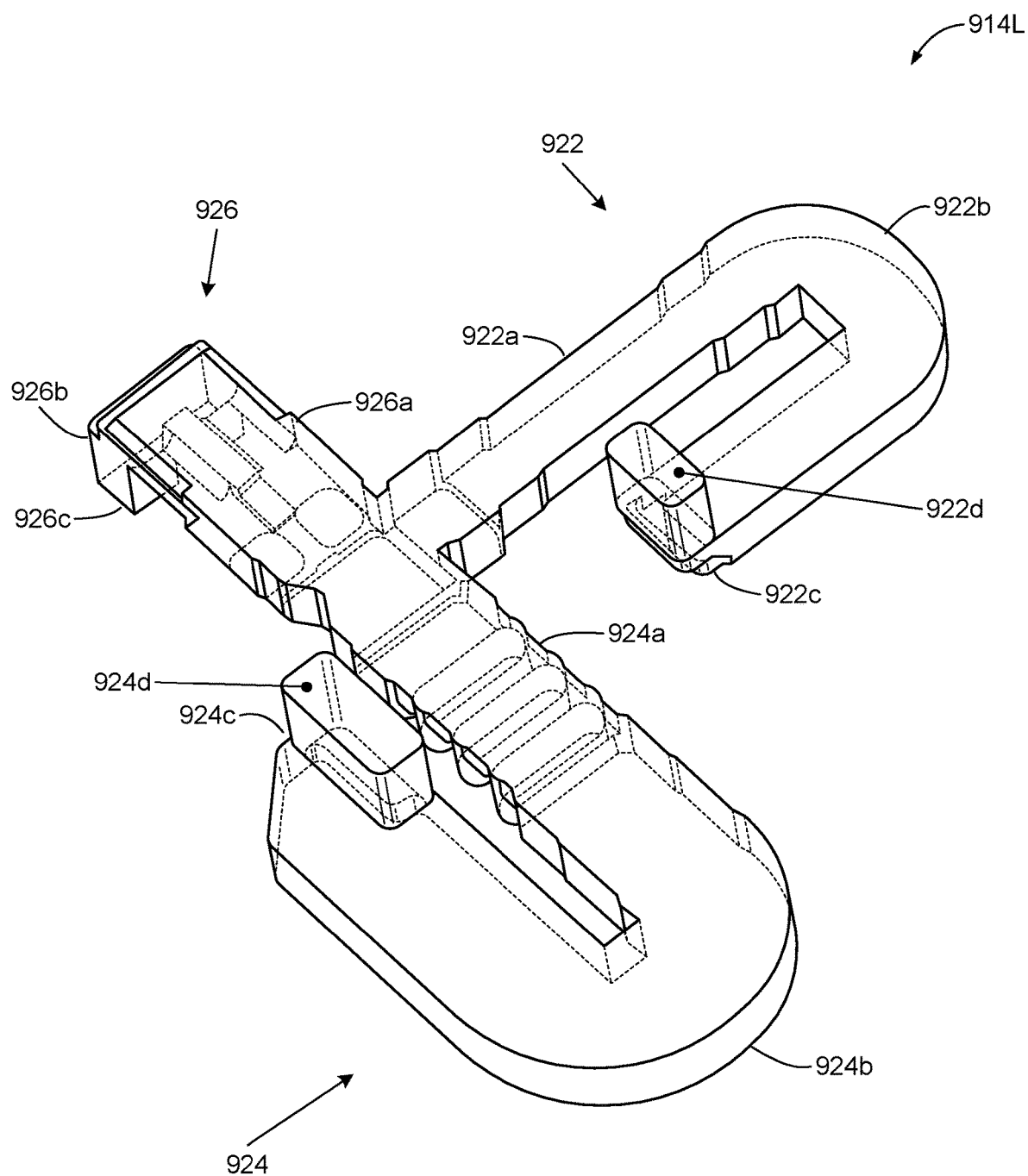

FIG. 11B shows additional details of diplexer 914L in accordance with the present disclosure. It will be understood that the diplexer 914R may have a similar, but mirror-imaged, structure. In some embodiments, diplexer 914L may comprise three waveguide segments 922, 924, 926. Waveguide segment 922 may include a filter 922a. In some embodiments, for example, filter 922a may be a high pass filter to filter signals to be transmitted and control out of band emissions. The filter 922a may couple to an H-plane U-bend 922b in order to minimize the diplexer routing area. The H-plane U-bend 922b may couple to an E-plane bend 922c. The E-plane bend 922c, in turn, may terminate at port 922d, which may couple to an output (transmit) port of the power amplifier module 484 to receive signals for transmission.

Waveguide segment 924 may include filter 924a. In some embodiments, filter 924a may be a low pass filter to filter received signals. The filter 924a may couple to an H-plane U-bend 924b in order to minimize the diplexer routing area. An E-plane bend 924c may be coupled to the plane U-bend 924b and terminate at a port 924d. The port 924d may couple to an input (rx) port of the second transceiver module 486 (FIG. 4) to receive signals from the second transceiver module 486.

Waveguide segment 926 may include a common waveguide 926a that the filters 922a and 924a couple to. The common waveguide 926a may couple to an E-plane bend 926b, which terminates at port 926c. The port 926c may couple to the waveguide assembly 500 (FIG. 5A), for example, at interface flange 534b of the waveguide assembly 500.

As noted above, in accordance with the present disclosure, the H-plane bends 922b, 924b may allow the diplexer 914L to be routed among the ports 922c, 924c, 926c while maintaining a small routing footprint. The E-plane bends 922c, 924c, 926b may allow the diplexer 914L to maintain a low profile within the package outline 412a of the RF & waveguide package 412 (FIG. 5A).

Figure 11C:
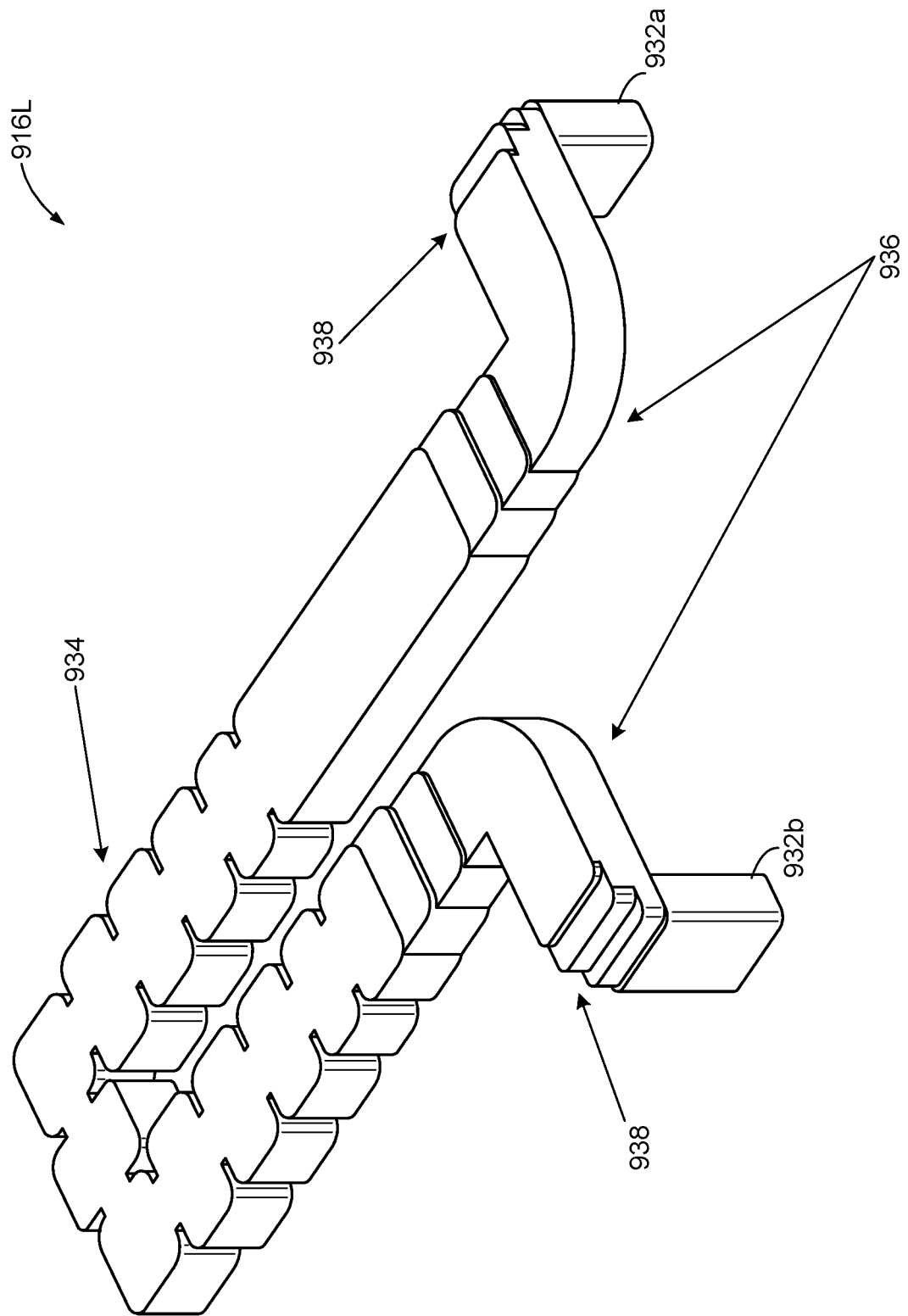

FIG. 11C shows additional details of bandpass filter waveguide 916L. In some embodiments, the bandpass filter waveguide 916L may include ports 932a, 932b. Port 932a may couple to an output of the second transceiver module 482. Port 932b may couple to an input of the power amplifier module 484. The bandpass filter waveguide 916L may include a combination of H-plane bends 946 and E-plane bends 948 to connect the ports 932a, 932b to filter 934. The H-plane bends 936 may allow the bandpass filter waveguide 916L to be routed between the first transceiver module 482 and the power amplifier module 484 with a small routing area. The E-plane bends 936 and 938 may allow the bandpass filter waveguide 916L to maintain a low profile within the package outline 412a of the RF & waveguide package 412 (FIG. 5A).

The above description illustrates various embodiments of the present disclosure along with examples of how aspects of the particular embodiments may be implemented. The above examples should not be deemed to be the only embodiments, and are presented to illustrate the flexibility and advantages of the particular embodiments as defined by the following claims. Based on the above disclosure and the following claims, other arrangements, embodiments, implementations and equivalents may be employed without departing from the scope of the present disclosure as defined by the claims.

What is claimed is:

1. An antenna comprising:
a single reflector;
a waveguide assembly having a feed assembly and a support member, wherein the support member extends from a location behind the single reflector to orient the feed assembly for direct illumination of the single reflector, wherein the support member has an arcuate shape and a leading edge along the arcuate shape that is oriented towards the single reflector, the leading edge having a tapered cross-section, and wherein the waveguide assembly comprises:
a first housing layer comprising a first waveguide of a pair of waveguides coupled to a first portion of a common waveguide of the feed assembly;
a second housing layer comprising a second waveguide of the pair of waveguides coupled to a second portion of the common waveguide; and
a septum layer between the first housing layer and the second housing layer, the septum layer comprising a septum polarizer coupled between the common waveguide and the pair of waveguides.

2. The antenna of claim 1, wherein the first waveguide corresponds to a first polarization, and the second waveguide corresponds to a second polarization.

3. The antenna of claim 1, further comprising a positioning system to point the antenna.

4. The antenna of claim 1, wherein the septum layer forms surfaces of the first and second waveguides of the pair of waveguides.

5. The antenna of claim 1, wherein the tapered cross-section has an ogive shape.

6. The antenna of claim 1, wherein the tapered cross-section mitigates scattering interaction between the support member and the single reflector.

7. The antenna of claim 1, wherein the support member is within a swept volume of the single reflector.

8. The antenna of claim 1, wherein the single reflector has an edge that is non-circular.

9. The antenna of claim 1, wherein the support member extends through an opening of the single reflector.

10. The antenna of claim 9, wherein the opening is at a periphery of the single reflector.

11. The antenna of claim 1, wherein the feed assembly comprises a dielectric insert within the common waveguide and extending beyond an opening of the common waveguide.

12. The antenna of claim 11, wherein the dielectric insert extends into a transition region of the common waveguide, wherein the transition region transitions between a rectangular waveguide and a circular waveguide and has a decreasing dimension.

13. The antenna of claim 1, wherein the support member has a trailing edge oriented away from the single reflector having a different cross-section than the leading edge.

14. The antenna of claim 13, wherein the trailing edge has a flat cross-section.

15. The antenna of claim 1, wherein:
the first housing layer further comprises an interface flange for the first waveguide that is behind the single reflector; and
the second housing layer further comprises an interface flange for the second waveguide that is behind the single reflector.

16. The antenna of claim 15, further comprising radio frequency (RF) electronics and a system of waveguides that couple the RF electronics to the interface flanges for the first and second waveguides of the pair of waveguides.

17. The antenna of claim 16, wherein the waveguide assembly, the RF electronics, and the system of waveguides are arranged within a swept volume of the single reflector.

18. The antenna of claim 16, wherein the system of waveguides includes one or more filters.

19. The antenna of claim 16, wherein the system of waveguides includes a first diplexer coupled to the first waveguide, and a second diplexer coupled to the second waveguide.

20. The antenna of claim 19, further comprising a transceiver having a first input port and a first output port coupled to the first diplexer, and having a second input port and a second output port coupled to the second diplexer.

* * * * *